(12) United States Patent
Tsuge et al.

(10) Patent No.: US 9,590,479 B2
(45) Date of Patent: Mar. 7, 2017

(54) STATOR FOR ROTATING ELECTRICAL MACHINE, METHOD FOR MANUFACTURING STATOR, AND METHOD FOR MANUFACTURING COIL FOR STATOR

(75) Inventors: Hiroshi Tsuge, Kariya (JP); Kazuyuki Yamaguchi, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 515 days.

(21) Appl. No.: 13/582,824

(22) PCT Filed: Mar. 8, 2011

(86) PCT No.: PCT/JP2011/055313
§ 371 (c)(1),
(2), (4) Date: Sep. 5, 2012

(87) PCT Pub. No.: WO2011/111682
PCT Pub. Date: Sep. 15, 2011

(65) Prior Publication Data
US 2013/0009509 A1    Jan. 10, 2013

(30) Foreign Application Priority Data

Mar. 11, 2010  (JP) .................................. 2010-054778
Apr. 20, 2010  (JP) .................................. 2010-096937

(51) Int. Cl.
*H02K 3/14*    (2006.01)
*H02K 15/04*   (2006.01)
*H02K 15/06*   (2006.01)

(52) U.S. Cl.
CPC ............. *H02K 15/045* (2013.01); *H02K 3/14* (2013.01); *H02K 15/066* (2013.01); *Y10T 29/49009* (2015.01)

(58) Field of Classification Search
CPC ............... H02K 3/04; H02K 3/12; H02K 3/14
(Continued)

(56) References Cited

U.S. PATENT DOCUMENTS

| 2,138,292 A  * | 11/1938 | Casale ..................... H02K 3/12 310/208 |
| 7,569,966 B2 * | 8/2009 | Saito ........................ H02K 3/12 310/179 |
| 2006/0066167 A1 | 3/2006 | Saito et al. |

FOREIGN PATENT DOCUMENTS

| CN | 101515733 | 8/2009 |
| EP | 1241774   | 9/2002 |

(Continued)

OTHER PUBLICATIONS

Machine Translation, JP 2008113474 A, Kawashima et al., May 15, 2008.*

(Continued)

*Primary Examiner* — Thomas Truong
(74) *Attorney, Agent, or Firm* — Greenblum & Bernstein, P.L.C.

(57) ABSTRACT

Disclosed is a stator for a rotating electrical machine, which includes a stator core having a plurality of slots, and a plurality of coils. Each of the coils has a first inserting section and a second inserting section, which are inserted into two slots which form a pair, a first coil end, and a second coil end. The first and/or the second coil end has a twisted portion and a bent portion. The twisted portion is formed by twisting the coil end at a part close to the first inserting section. The bent portion is formed by bending, at a part close to the second inserting section, the coil end such that the coil end is laid flat.

6 Claims, 20 Drawing Sheets

(58) Field of Classification Search
USPC .......................... 310/201, 208, 179, 180, 184
IPC ........................................ H02K 3/04, 3/12, 3/14
See application file for complete search history.

(56) References Cited

FOREIGN PATENT DOCUMENTS

| | | |
|---|---|---|
| JP | 8-298756 | 11/1996 |
| JP | 2002-330572 | 11/2002 |
| JP | 2003-153478 | 5/2003 |
| JP | 2006-101654 | 4/2006 |
| JP | 2007-166850 | 6/2007 |
| JP | 2008-104293 | 5/2008 |
| JP | 2008-113474 | 5/2008 |
| JP | 2008-211880 | 9/2008 |
| JP | 2009-011151 | 1/2009 |

OTHER PUBLICATIONS

"twisted". Dictionary.com Unabridged. Random House, Inc. Apr. 21, 2016. <Dictionary.com http://www.dictionary.com/browse/twisted>.*
Chinese Office Action dated May 23, 2014.
International Preliminary Report on Patentability for PCT/JP2011/055313, dated Oct. 2, 2012.

* cited by examiner

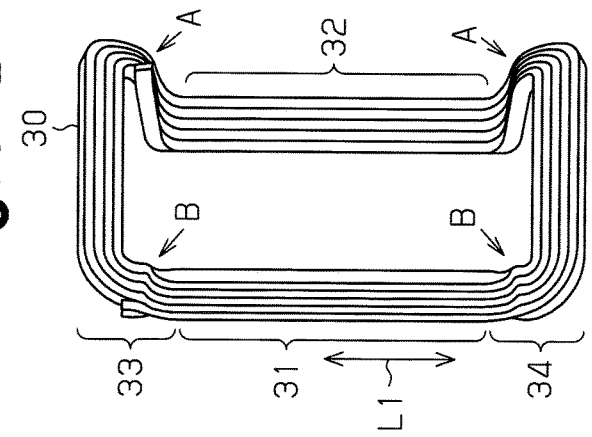
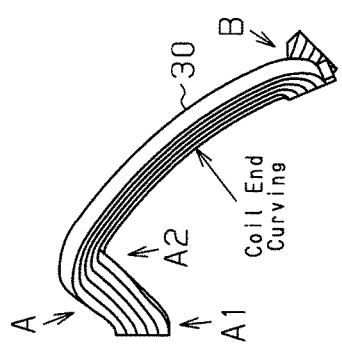
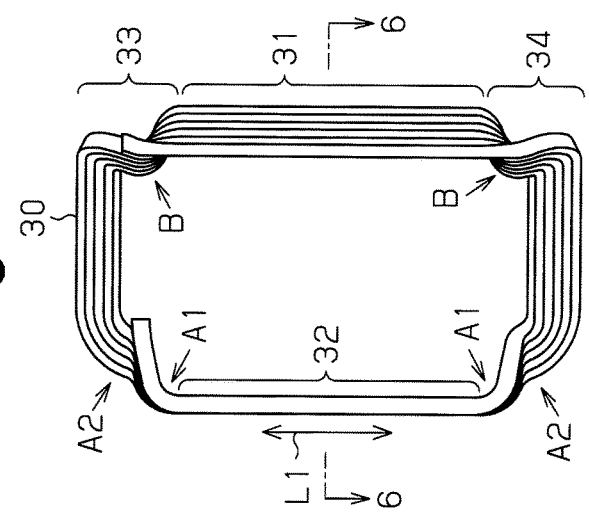
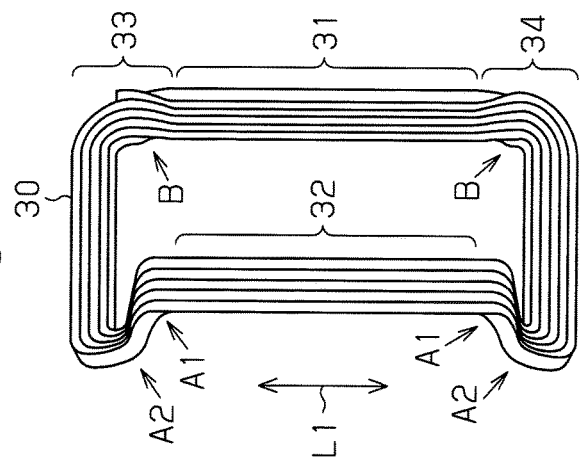

STATOR FOR ROTATING ELECTRICAL MACHINE, METHOD FOR MANUFACTURING STATOR, AND METHOD FOR MANUFACTURING COIL FOR STATOR

TECHNICAL FIELD

The present invention relates to a stator for an electric rotating machine, a method for manufacturing a stator, and a method for manufacturing coils for a stator

BACKGROUND ART

In patent document 1, coils are formed by performing edgewise bending as shown in FIG. 3 of patent document 1. Further, as shown in FIGS. 2, 6, and 8 of patent document 1, the coil ends include peak portions formed to be crank-shaped. As a result, in a state in which the coil ends are overlapped in the axial direction of a stator, interference is avoided in the axial direction.

In patent document 2, coils are formed by performing flatwise bending as shown in FIG. 14 of patent document 2. Further, as shown in FIG. 16 of patent document 2, in a coil, a portion that joins a slot insertion portion and a connection portion of a coil end includes two twisted sections. Further, as shown in FIG. 2 of the patent document 2, coil end portions are overlapped with one another in the radial direction of a stator (that is, shaped so as not to interfere in the radial direction of the stator).

As shown in FIG. 32, a stator core 71 in patent document 3 includes a plurality of slots 71a, which are formed at predetermined intervals, and a plurality of coils 72, each coupled to two of the slots 71a. Each slot 71a includes an opening directed inward in the radial direction. The opening has a smaller width than a portion of the slot 71a located inward from the opening. Each coil 72 includes a first side 72a and second side 72b, each having a first end and a second end, a third side 72c, which is continuous with the first ends of the first and second sides 72a and 72b, and a fourth end 72d, which is continuous with the second ends of the first and second sides 72a and 72b. The first and second sides 72a and 72b are stacked to form an aligned winding to have a thickness allowing for insertion into two slots 71a. The third side 72c, which is located at a position shifted from the first and second sides 72a and 72b in the extending direction of the first and second sides 72a and 72b, is stacked to have a width that is smaller than the width of the opening of the slot 71a in a direction perpendicular to the stacking direction. The third side 72c passes by the opening of the slot 71a to arrange the first and second sides 72a and 72b in the two slots and couple the first and second sides 72a and 72b to the stator core 71.

Further, patent document 4 discloses a method for manufacturing a stator that prepares a plurality of coils in advance, inserts a first side of each coil into one of a plurality of slots in a stator core, and then inserts a second side of each coil into another one of the slots so that the coils are spirally overlapped as viewed from an end surface of the stator core. In the method of patent document 4, a holding jig, which has an outer circumference including a plurality of slit-shaped holding grooves of an integral multiple of the slot pitch of the stator core, is used to attach a plurality of coils, which are formed in advance, to the stator core. In a state in which a first side of each coil is arranged at an outer side of the holding jig and a second side is arranged in the holding groove, each coil is arranged along the circumference of the holding jig. Further, an auxiliary jig, which includes a plurality of blades corresponding to inner teeth of the stator core, is arranged on the end surface of the holding jig, and the first side of each coil is held in a gap of the corresponding first blade. The combination of the holding jig and the auxiliary jig is inserted into the stator core from the auxiliary jig, and the first side of each coil is guided by the auxiliary jig and inserted into the corresponding slot of the stator core by an edge of the holding jig. The holding jig arranged inside the stator core in this manner is pivoted by a predetermined angle to position the holding grooves in alignment with the corresponding slots. Then, the second side of each coil is pushed outward in the radial direction by a pushing portion and inserted into the corresponding slot of the stator core.

PRIOR ART DOCUMENTS

Patent Documents

Patent Document 1: Japanese Laid-Open Patent Publication No. 2008-104293
Patent Document 2: Japanese Laid-Open Patent Publication No. 2008-113474
Patent Document 3: Japanese Laid-Open Patent Publication No. 2003-153478
Patent Document 4: Japanese Laid-Open Patent Publication No. 2007-166850

SUMMARY OF THE INVENTION

Problems that are to be Solved by the Invention

As shown in FIG. 10 of patent document 1, the coils of adjacent different phases are overlapped with each other in the axial direction of the stator. This makes the insertion of an inter-phase insulative paper difficult. Thus, the coils are not suitable for a high voltage machine.

As shown in FIG. 19 of patent document 2, the number of twists (twist sections) is "two" and large. Thus, the coil processing load is large. This deteriorates an insulative coating of enamel or the like applied in advance to the coils. Thus, this structure is not suitable for a high voltage machine.

In the stator described in patent document 3, the third side 72c of the coil 72 is shaped to be arranged inward in the radial direction of the stator core 71. This imposes limitations on the design of the electric rotating machine.

In the method of patent document 4, the angle at which the holding jig is rotated is large. This increases the deformation amount of the coil. When the deformation of the coil is large, the residual stress of the coil increases. Thus, it becomes difficult for the coil to enter the slot.

It is a first object of the present invention to decrease the number of twists in a coil end and facilitate insertion of an inter-coil insulative sheet.

It is a second object of the present invention to manufacture a stator that does not impose many limitations on the designing of an electric rotating machine and that does not greatly deform the coils.

To achieve the first object, a first aspect of the present invention is a stator for an electric rotating machine including an annular stator core and a plurality of distributed winding coils coupled to the stator core. The stator core includes a plurality of slots arranged along a circumferential direction and opening inward in a radial direction. The stator core includes two end surfaces located at opposite sides in an axial direction of the stator core. Each of the coils includes a first insertion portion and a second insertion portion, which are inserted into two of the slots, and a first coil end and a second coil end, which respectively project from the two end surfaces. At least one of the first and second coil ends includes a twisted portion and a bent portion. The twisted portion is formed by twisting the coil end at a location near the first insertion portion. The bent portion is formed by bending the coil end near the second insertion portion.

A second aspect of the present invention is a coil manufacturing method for a stator of an electric rotating machine. The method includes a winding step, a twisting step, and a bending step. The winding step winds a conductive wire into an annular shape to form a coil including a first insertion portion, a second insertion portion, a first coil end, and a second coil end. The twisting step twists each of the coil ends near the first insertion portion. The bending step bends each of the coil ends near the second insertion portion.

To achieve the second object, a second aspect of the present invention is a manufacturing method of a stator for an electric rotating machine including the step of preparing an annular stator core including a plurality of slots arranged along a circumferential direction. Each of the slots includes an opening that opens in an inner circumference of the stator core. A slot pitch between adjacent ones of the slots increases toward outside in a radial direction of the stator core. The manufacturing method includes the step of preparing a plurality of coils. Each of the coils forms a closed loop with a conductive wire in advance and includes two coil ends and a first side and a second side, which are inserted into the slot. The two coil ends can absorb changes in the distance between the first side and the second side. The first side and the second side are in a positional relationship set in advance to correspond to a positional relationship when the first side and the second side are inserted into the slots. The manufacturing method includes the step of preparing a holding jig that can be arranged at a radially inner side of the stator core. The holding jig includes holding grooves in a circumference at locations each opposing the opening in a state arranged at the radially inner side of the stator core. The holding jig includes two end surfaces at it two axial ends. The manufacturing method includes the step of coupling each of the coils to the holding jig by inserting the second sides into the holding grooves. When viewing the holding jig from its axial direction in the coupled state, the first sides are located outward in a radial direction of the holding jig, at least one of the two coil ends includes a first portion, which is located in a range of the first side, and a second portion other than the first portion. The second portion is located on a portion corresponding to the holding grooves at one of the two end surfaces. The manufacturing method includes the step of moving one of the stator core and the holding jig relative to the other one in the axial direction in a state in which the axis of the holding jig and the axis of the stator core are aligned with each other to arrange the holding jig at the radially inner side of the stator core and thereby insert the first side into the slot. The manufacturing method includes the step of rotating one of the stator core and the holding jig relative to the other one so that the second side inserted into each holding groove is opposed to the slit in which the second side is to be inserted. The manufacturing method includes the step of inserting the second side into the slot with an ejecting portion by applying ejecting force to the coil that forces the second side from the holding groove into the corresponding slot.

A fourth aspect of the present invention is a stator for a rotating electrical machine. The stator includes an annular stator core and a plurality of coils coupled to the stator core. The stator core includes a plurality of slots arranged along a circumferential direction. The plurality of slots each include an opening that opens at an inner circumference of the stator core. A slot pitch between adjacent ones of the slots increases toward outside in a radial direction of the stator core. Each of the coils includes a first side and a second side, which are inserted into the slots, and two coil ends, which are continuous with the first side and the second side. One of the two coil ends includes a first bent portion, a second bent portion, and a joining portion. The first bent portion is bent from an end of the first side toward the radial direction of the stator core. The second bent portion is bent from an end of the second side toward the circumferential direction of the stator core. The joining portion extends along the circumferential direction of the stator core and includes a first end, which is continuous with the first bent portion, and a second end, which is continuous with the second bent portion.

BRIEF DESCRIPTION OF THE DRAWINGS

FIG. 5(a) is a plan view showing the coil after a shaping step, FIG. 5(b) is a front view showing the coil after the shaping step, FIG. 5(c) is a left view showing the coil after the shaping step, and FIG. 5(d) is a right view showing the coil after the shaping step.

DETAILED DESCRIPTION OF THE PREFERRED EMBODIMENTS

A first embodiment of the present invention will now be described with reference to the drawings.

Figure 1:
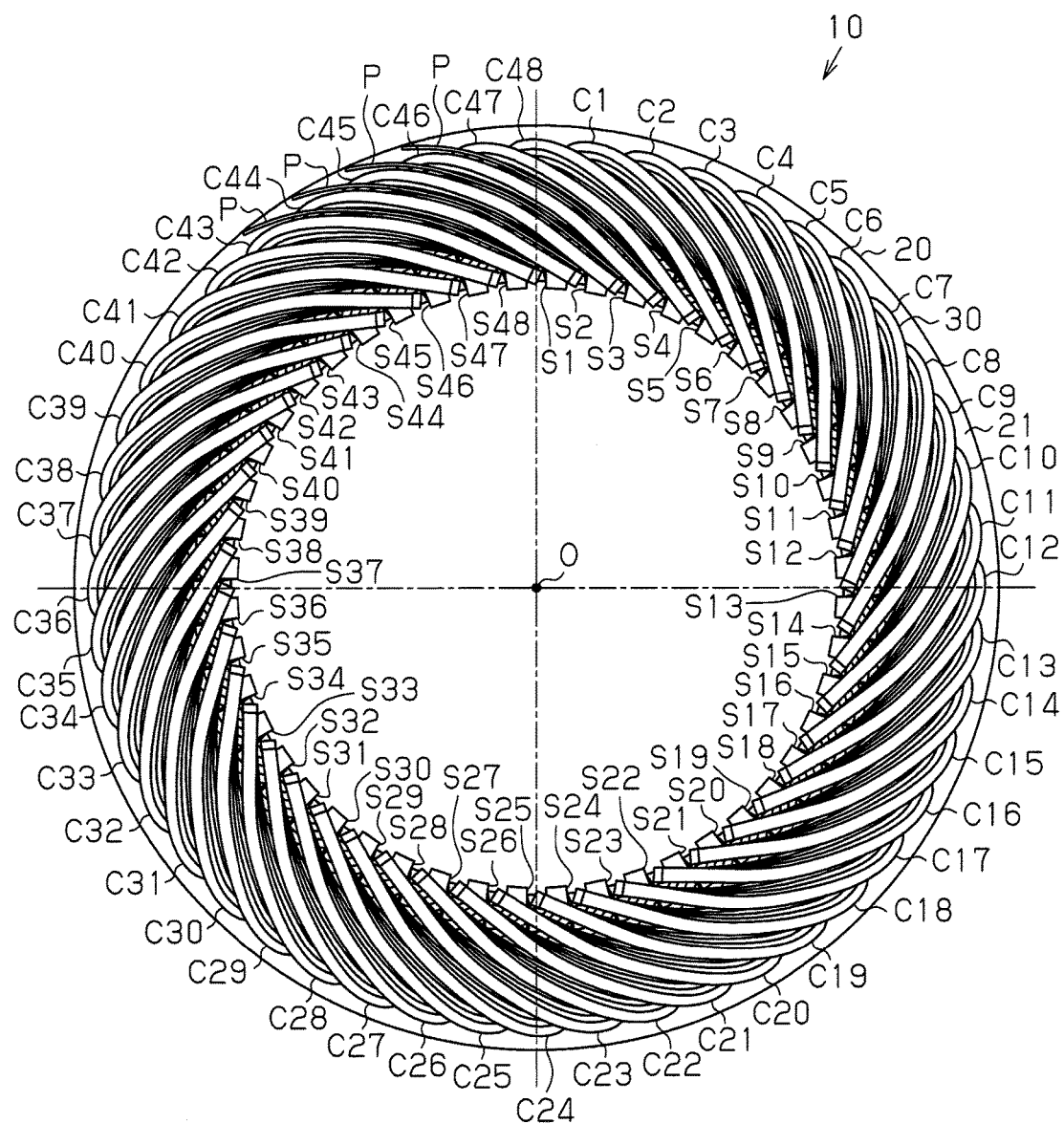
FIG. 1 is a plan view showing a stator of a motor according to a first embodiment of the present invention.
Figure 2:
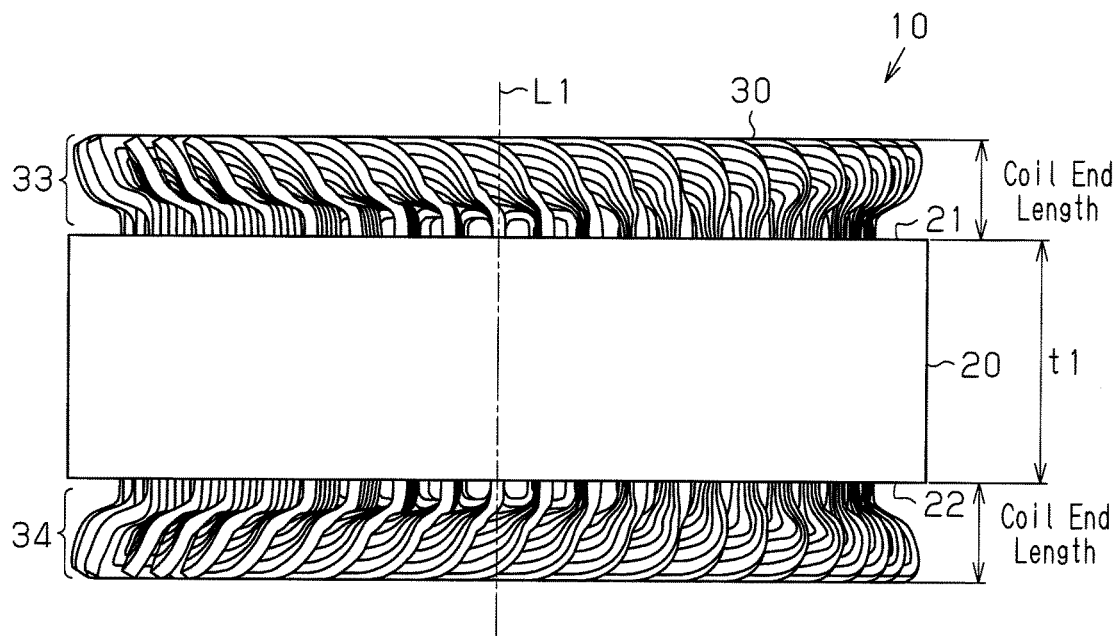
FIG. 2 is a front view showing the stator of FIG. 1.
Figure 3:
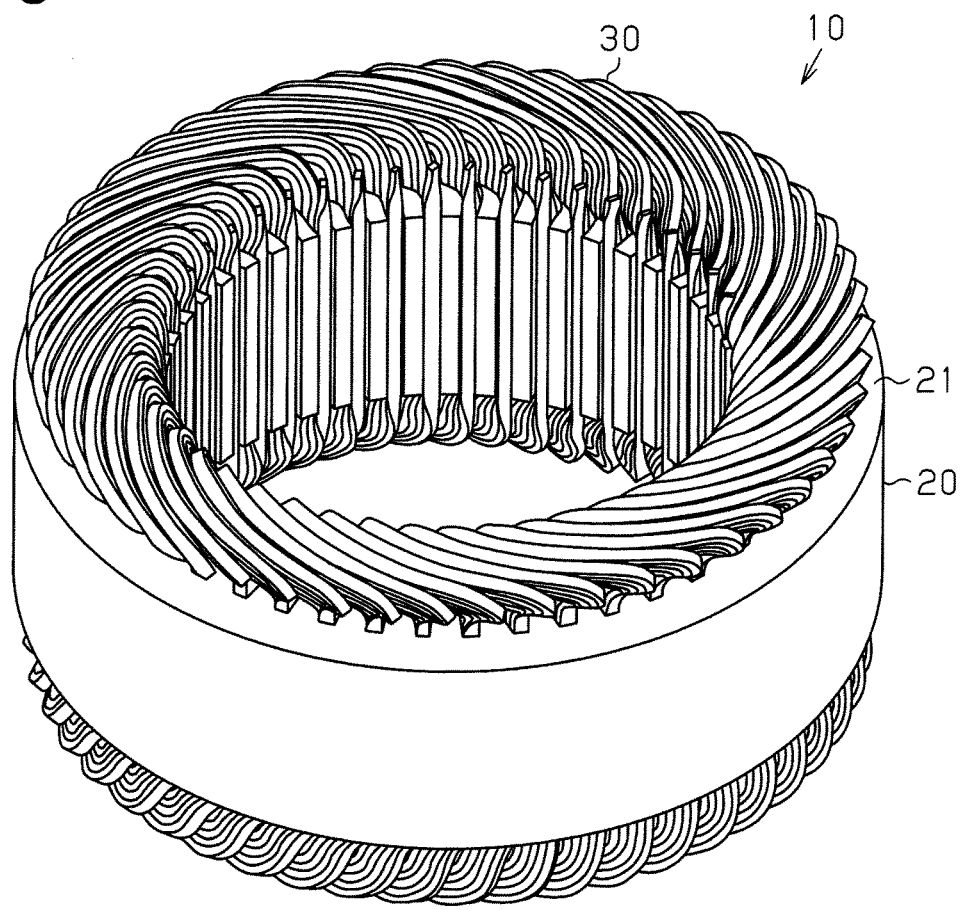
FIG. 3 is a perspective view showing the stator of FIG. 1.

FIGS. 1, 2, and 3 show a stator 10 of a motor in the first embodiment. The stator 10 is used in a distributed winding, three-phase eight-pole motor.

As shown in FIGS. 1, 2, and 3, the stator 10 includes an annular stator core 20 and coils 30, which are inserted into slots of the stator core 20. The coils 30 are distributed winding coils.

As shown in FIG. 2, the stator core 20 has a predetermined thickness t1. The axial direction (axis) of the stator 10 (stator core 20) is indicated by L1. Forty-eight slots (indicated by reference characters S1 to S48 in FIG. 1) are arranged in the circumferential direction along the inner circumference of the stator core 20. Each of the slots S1 to S48 opens toward the inner circumference, has a rectangular cross-section, and extends along a radial line from the center O of the stator core 20. Further, teeth are formed between adjacent slots in the stator core 20.

A rotor is arranged within the annular stator 10.

Figure 4:
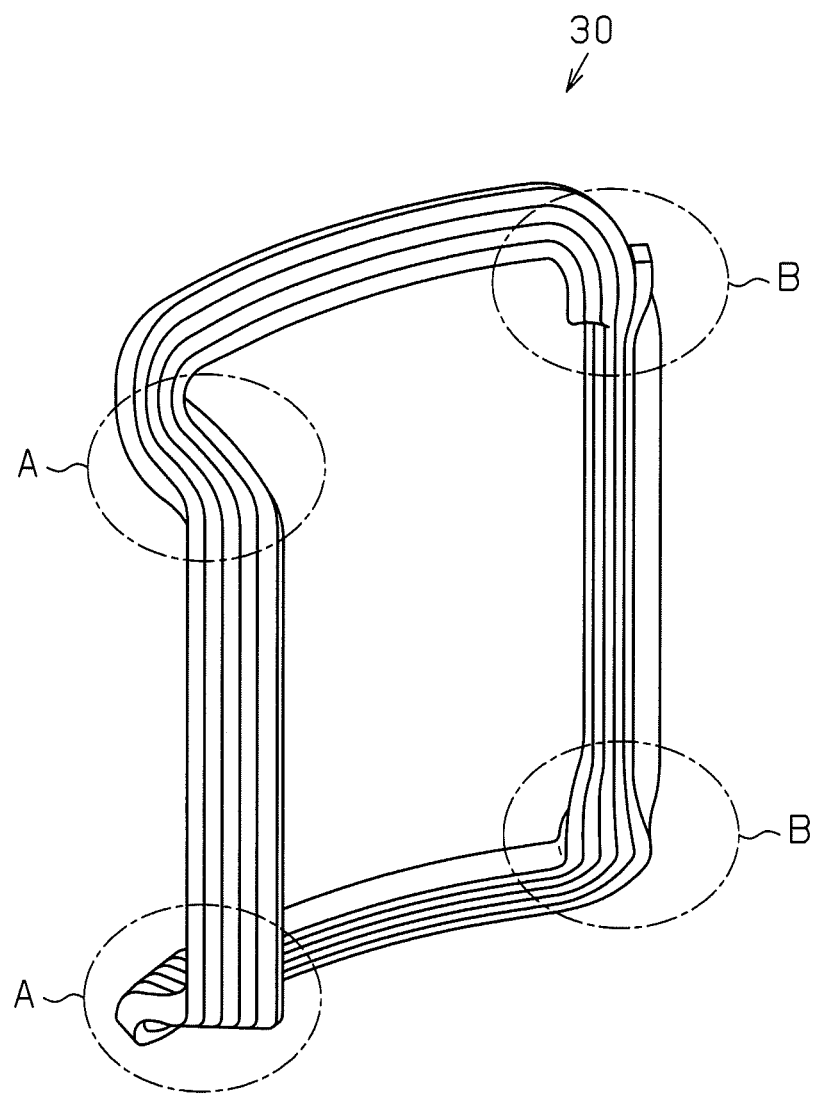
FIG. 4 is a perspective view showing a coil of the stator of FIG. 1.
Figure 6:
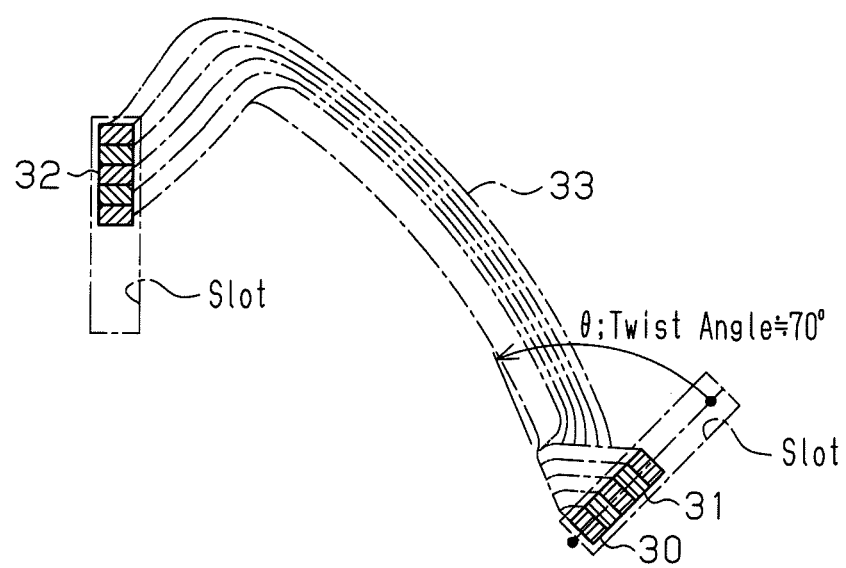
FIG. 6 is a cross-sectional view taken along line 6-6 in FIG. 5(b).

FIGS. 4, 5, and 6 show a coil 30. The coils 30 are lap winding coils. There are forty-eight coils 30 indicated by reference characters C1 to C48 in FIG. 1.

The coils 30 are inserted into the slots and incorporated in the stator core 20. More specifically, each of the forty-eight coils (C1 to C48) is inserted into two of the slots (S1 to S48) in the stator core 20. For example, in FIG. 1, coil C1 is inserted into slot S1 and slot S7, which is the sixth one in the clockwise direction from slot S1 (when counting slot S1 as the 0th one). In this manner, in the slots formed along the circumferential direction in the inner circumferential surface of the stator core 20, the interval (pitch) of the two slots into which the coils 30 are inserted is "six". That is, the coil pitch is "six".

Further, two coils 30 are inserted into a single slot. For example, in FIG. 1, coil C1 and coil C43 are inserted into slot S1.

Figure 11:
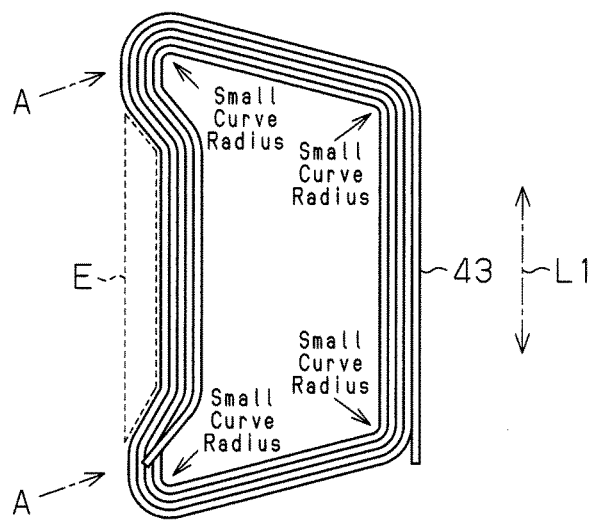
FIG. 11 is a plan view showing a coil shape after the coil winding when forming a coil.

As shown in FIG. 6, the coil 30 is formed by a plurality of aligned conductive wires, and rectangular wires are used as the conductive wires. As shown in FIGS. 2 and 5, the coil 30, which is shaped in advance to have an annular shape, includes two insertion portions (first insertion portion and second insertion portion) 31 and 32, which are inserted into two slots, and two coil ends (first coil end and second coil end) 33 and 34, which overhangs out of the slots. Flatwise winding is performed to wind the coil 30 (refer to FIG. 11 showing the coil shape after coil winding when forming the coil).

As shown in FIG. 6, the insertion portions 31 and 32 of the coil is arranged in the slots so that the long sides of the rectangular wires having a rectangular cross-section are in contact with each other and the rectangular wires are arranged in a line. Further, the coil 30 forms a lap winding. More specifically, as shown in FIGS. 1 and 6, in the coil ends 33 and 34, the rectangular wire stacked and arranged in one of the slots and located at the innermost side extends to correspond to the rectangular wire stacked and arranged in the other one of the slots and located at the outermost side.

In the coil 30, each of the coil ends 33 and 34 includes one section where the coil 30 is bended in the circumferential direction (bent portion A in FIGS. 4 and 5) and one section defining a twisted portion B (FIGS. 4 and 5).

As shown in FIG. 5, in the coil end 33 projecting from one of two end surfaces 21 and 22 (refer to FIG. 2) of the stator core 20, namely, the end surface (first end surface) 21, the twisted portion B is formed by twisting a section that is continuous with the insertion portion 31, among the insertion portions 31 and 32 inserted into the two slots. In the first embodiment, as shown in FIG. 6, the coil end 33 is twisted by about 70° in the counterclockwise direction. The coil end 34 projecting from the end surface of the stator core 20 has a similar structure. In this manner, the twisted portions B are formed by twisting sections that are continuous with the insertion portion 31.

Further, in the coil end 33, the bent portion A is formed by bending a section that is continuous with the second insertion portion 32, among the insertion portions 31 and 32 inserted into the two slots, twice (A1 and A2) in the circumferential direction. In detail, the bent portion A includes a "first bent section formed by bending the coil", which is indicated by A1, and a "second bent section formed by bending the coil", which is indicated by A2. The bent section A1 of FIG. 5(b) is bent by almost 90°, and the bent section A2 of FIG. 5(c) is bent by about 45°. The bent portion A includes the bent section A2 as a rising portion where the bended coil end rises in the axial direction of the stator. In the same manner, the coil end 34 includes the bent portion A. That is, in the coil end 34, a section continuous with the insertion portion 32 is bent twice (A1 and A2) and bended in the circumferential direction.

In this manner, the coil 30 is wound by undergoing flatwise bending. Further, as shown in FIGS. 4 and 5, the twisted portion is arranged at one location for each coil end, and the coil is bended in the circumferential direction at the bent portion A.

Further, as shown in FIG. 5(a), in the coil ends 33 and 34 of the coil 30, a connection portion between the twisted portion B and the bent portion A is formed to have an arcuate shape that is convex outward in the radial direction. As a result, the coil ends 33 and 34 are shaped so as not to interfere with each other in the radial direction of the stator core, and the coil ends 33 and 34 do not contact the coil ends of the other coils.

Figure 7:
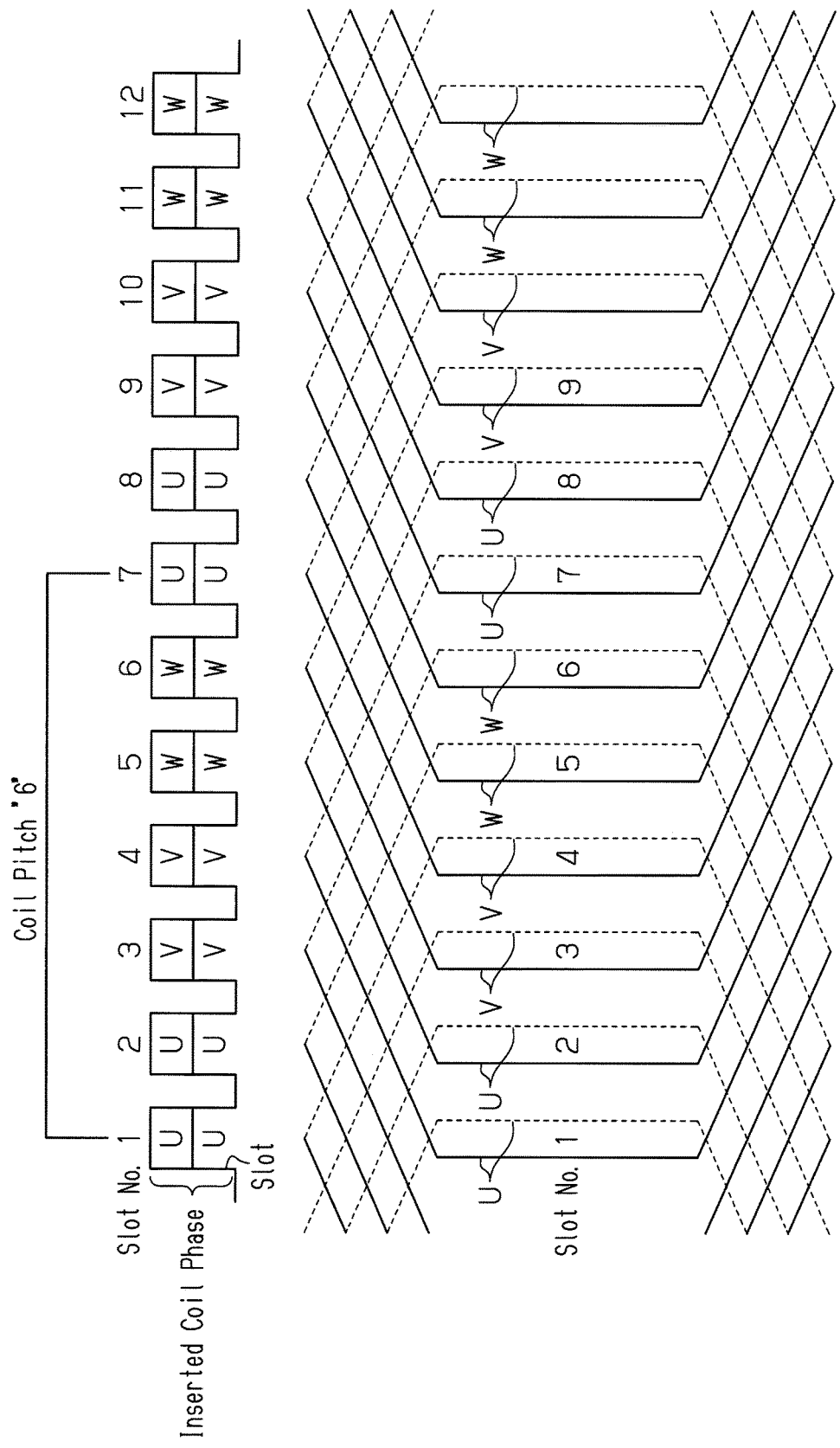
FIG. 7 is a schematic diagram showing slots, coils, and the connected state of the coils when spreading out the stator.

FIG. 7 shows the slots, coils, and connected state of the coils when spreading out the stator of the first embodiment. As shown in FIG. 7, two coils are inserted into a single slot, and the pitch of the coils is "six". For example, in FIG. 7, the phases of the inserted coils in slot number 1 are a U phase coil and a U phase coil. The phases of the inserted coils in slot number 2, which is adjacent to the right of slot number 1, are also a U phase coil and a U phase coil. The phases of the inserted coils in slot number 3, which is adjacent to the right of slot number 2, are a V phase coil and a V phase coil.

In this manner, the coil end of a coil includes the twisted portion B, which is formed by twisting a section close to the first insertion portion, and the bent portion A, which is formed by bending a location close to the second insertion portion.

FIG. 1 shows insertion locations of inter-phase insulative papers P, which serve as inter-coil insulative sheets. The coils ends of adjacent coils having different phases are overlapped in a state extending diagonally relative to the circumferential direction. The coil ends are not overlapped in the axial direction of the stator. Thus, the inter-phase insulative papers P are inserted from above the stator core (i.e., the axial direction of the stator core).

In this manner, space is formed between portions overlapped in the circumferential direction in the coil ends of adjacent coils. The space has a shape including a generally flat plane extending between the two coil ends in the axial direction of the stator. Here, the "axial direction of the stator" does not have to completely conform to the axial direction of the stator and may be slightly inclined. Further, a "generally flat surface" may be slightly curved (curved to allow for insertion of the inter-phase insulative paper P).

The formation of the coil will now be described with reference to FIGS. 8, 9, 10, and 11.

Figure 8:
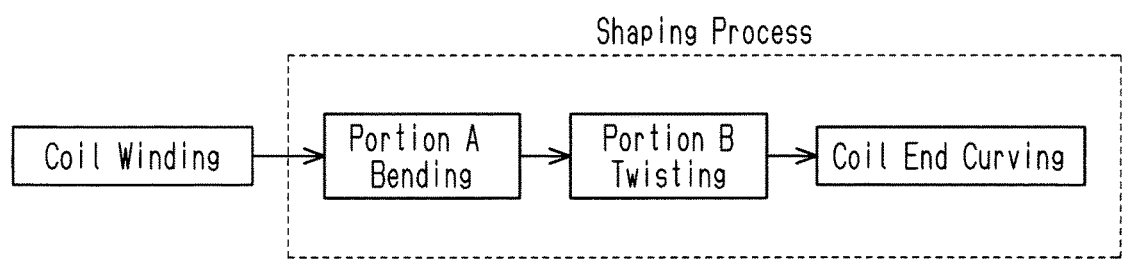
FIG. 8 is a process chart showing a formation process of a coil.
Figure 9:
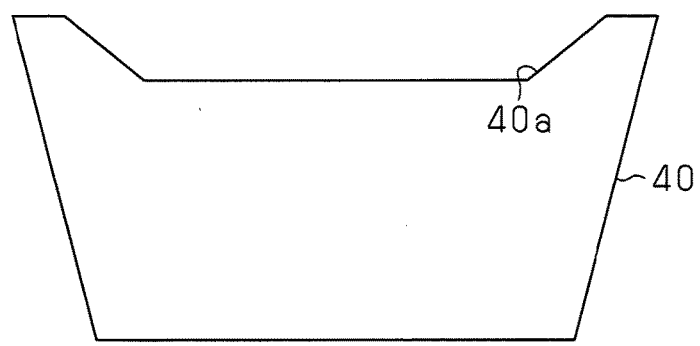
FIG. 9 is a profile diagram showing a winding frame used to form a coil.

FIG. 8 shows a manufacturing process of the coil. During the coil formation, a winding frame 40 shown in FIG. 9 is used. The winding frame 40 of FIG. 9 has a profile with a trapezoidal shape. Among the parallel sides of the trapezoid, the longer side includes a recess 40a. As shown in FIGS. 10(a) to 10(i), coil winding is performed during the coil formation. As a result, as shown in FIG. 11, a rectangular shape takes the coil shape after the coil winding.

In FIG. 8, the coil formation undergoes a shaping process after performing coil winding on the rectangular wire. The coil winding will now be described.

Figure 10A:
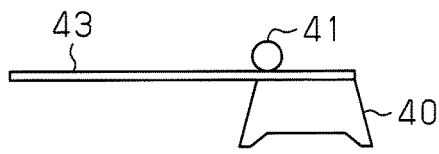
FIGS. 10(a) to 10(i) are schematic diagrams illustrating coil winding performed to form a coil.
Figure 10B:
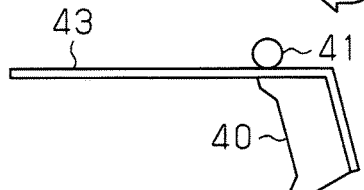
Figure 10C:
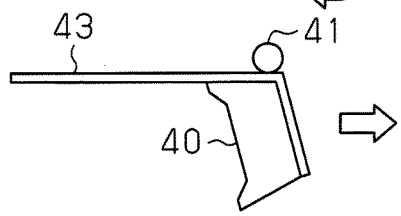
Figure 10D:
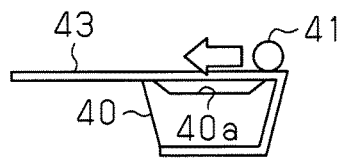

As shown in FIG. 10(a), a winding apparatus includes the winding frame 40 shown in FIG. 9 and the roller 41. One end of a rectangular wire 43 is fixed to the outer surface of the winding frame 40. In detail, the rectangular wire 43 is fixed to the shorter one of the parallel sides of the trapezoid of the winding frame 40. Further, as shown in FIG. 10(b), the winding frame 40 is rotated to flatwise bend and wind the rectangular wire 43 to an oblique side of the winding frame 40. Further, the winding frame 40 is moved as shown in FIG. 10(c) and the winding frame 40 is rotated as shown in FIG. 10(d) to flatwise bend and wind the rectangular wire 43 to the longer one of the parallel sides of the trapezoid of the winding frame 40.

Figure 10E:
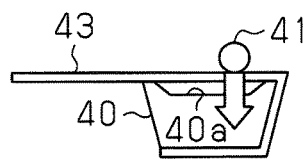
Figure 10F:
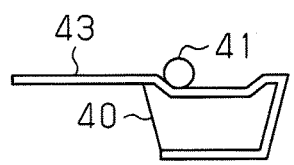
Figure 10G:
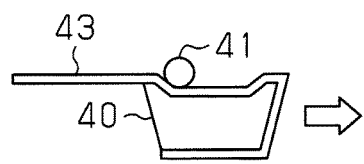
Figure 10H:
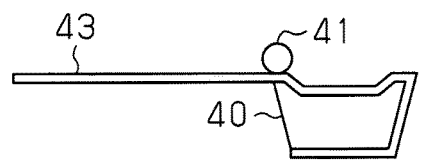
Figure 10I:
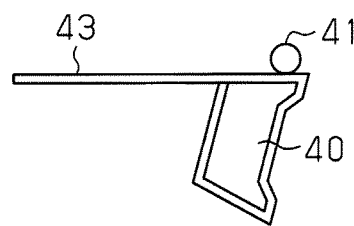

Then, as shown in FIGS. 10(e), 10(f), and 10(g), from a state in which the rectangular wire 43 is stretched across the recess 40a of the winding frame 40, the roller 41 is moved along the surface of the recess 40a in the winding frame 40 to shape the rectangular wire 43 in conformance with the recess 40a of the winding frame 40 as shown in FIG. 10(h). Further, as shown in FIG. 10(i), the winding frame 40 is rotated to flatwise bend and wind the rectangular wire 43 to an oblique side of the winding frame 40. This flatwise bends and winds the rectangular wire 43 once entirely around the winding frame 40.

The operations of FIGS. 10(a) to 10(i) are repeated to flatwise bend and wind the rectangular wire 43 around the winding frame 40 a plural number of times.

Such coil winding winds the coil in an annular manner into the coil shape shown in FIG. 11. Here, flatwise bending is performed. Thus, the bend radius (R) in FIG. 11 is small. Further, in FIG. 11, the shape of the wound coil is generally trapezoidal, a recess is formed on a longer one of the parallel sides of the trapezoid, and the two ends of the longer one of the parallel sides of the trapezoid are where the bent portions A are formed.

Returning to FIG. 8, the shaping process after the coil winding will now be described.

The shaping process includes a step for forming the bent portion A (portion A bending), a step for forming the twisted portion B (portion B twisting), and a step for curving the coil ends as shown in FIG. 5(a).

In the step for forming the twisted portion B, a section continuous from the first insertion portion 31 in the coil end 33 is twisted. In the same manner, a second continuous from the first insertion portion 31 in the coil end 34 is twisted.

In the step for forming the bent portion A, a section continuous from the second insertion portion 32 in the coil end 33 is bent twice along the circumferential direction. In detail, in FIG. 5, the first bent section A1 is formed by bending the coil, and the second bent section A2 is formed by bending the coil. In the same manner, a section continuous from the second insertion portion 32 in the coil end 34 is bent twice along the circumferential direction.

In the step of curving the coil end as shown in FIG. 5(a), the part of the coil end 34 continuous with the insertion portions 31 and 32 to the distal portion is shaped into an arcuate shape (in broad terms, curved shape) so as to be convex outward in the radial direction.

In the shaping process of FIG. 8, the bent portion A formation step (portion A bending), the twisted portion B formation step (portion B twisting), and the coil end curving step may be performed in any order. For example, after performing the bent portion A formation, the twisted portion B formation may be performed, and then the coil end curving may be performed. Further, the bent portion A formation step, the twisted portion B formation step, and the coil end curving step may be performed at the same time.

The coils 30, which are shaped in advance, are inserted into and coupled to the slots of the stator core 20. As a result, in comparison to when pressing the coil ends after inserting the coils into the slots, the deformation of the coils is facilitated since the coils can be deformed before being coupled to the slots.

The first embodiment has the advantages described below.

(1) In patent document 1, adjacent coils of different phases are in contact with each other at the coil ends making it difficult to insert an inter-phase insulation paper. Thus, the structure of patent document 1 is not suitable for a high voltage machine. In contrast, in the first embodiment, the adjacent coils of different phases are in contact with each other in the radial direction as shown in FIG. 1. Thus, an inter-phase insulative paper P can be inserted from the axial direction, and the insertion is easy. As a result, the structure of the first embodiment is preferable when the motor is of a high voltage specification.

Further, in patent document 2, the number of twists in the coil end is "two" and large. Further, due to the large coil processing load, an insulative coating easily deteriorates. Thus, the structure of patent document 2 is not suitable for a high voltage machine. In contrast, in the first embodiment, as shown in FIG. 4, each coil end includes a single portion (bent portion A) where the coil is bended in the circumferential direction and a single twisted portion B. Thus, the number of twists (twisted sections) is "one" and small, and the coil processing load is small. As a result, the structure of the first embodiment can suppress deterioration of an insulative coating, and the structure of the first embodiment is suitable for a high voltage machine. In this manner, the number of coil twists in the shaping process is only "one", the twist number at the coil end can be decreased, and the processing load can be decreased. In this manner, since the coil processing load can be decreased, the thickness of an enamel coating can be decreased. Thus, the structure of the first embodiment reduces costs, is suitable for a high voltage machine, and can be used in a wide range.

Figure 15:
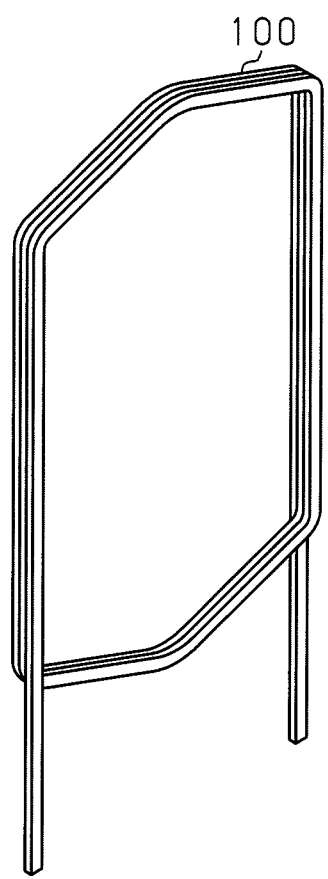
FIG. 15 is a perspective view showing a coil for comparison.

(2) In patent document 1, as shown in FIG. 15, a coil 100 uses a rectangular wire as a conductive wire and is formed by winding the rectangular wire through edgewise bending. Since the cross-sectional coefficient of a bent portion is high and the processing load is large, the coil 100 is difficult to form. Further, the bending radius (bending R) increases, and the coil end length increases. In contrast, in the first embodiment, the coil uses a rectangular wire as a conductive wire and is formed by winding the rectangular wire through flatwise bending. Thus, the coil can be easily bent. In other words, the coil winding produces a small processing load due to the flatwise bending, and the coil is easy to form. This allows for reduction in costs.

Further, since the coil is formed through flatwise bending, the bending radius (bending R) is small, and the coil includes a portion bended outward. Thus, as shown in FIG. 2, the coil end length in the axial direction of the stator can be decreased, and the motor can be reduced in size.

(3) In the coil 30, the connection portion between the twisted portion B and the bent portion A in the coil ends 33 and 34 is formed to have a curved shape that is convex outward in the radial direction. Thus, adjacent coils do not easily interfere with each other. This is preferable for avoiding contact between coils.

(4) The coil manufacturing method includes a winding step that winds a conductive wire in an annular manner to form a coil, a twisting step that twists a section in a coil end at the side of one of the two insertion portions, namely, the first insertion portion in the wound coil, and a bending step that bends a section in a coil end at the side of one of the two insertion portions, namely, the second insertion portion. Further, the bending step includes a raising step that raises the bended coil in the axial direction of the stator. In the coil end of the wound coil, the connection portion of the conductive wire between the twisted portion, which is formed in the twisting step, and the bent portion, which is formed in the bending step, is shaped into a curved shaped that is convex outward in the radial direction.

This obtains a coil having the structure with advantages (1), (2), and (3).

The first embodiment may be modified as described below.

Figure 12:
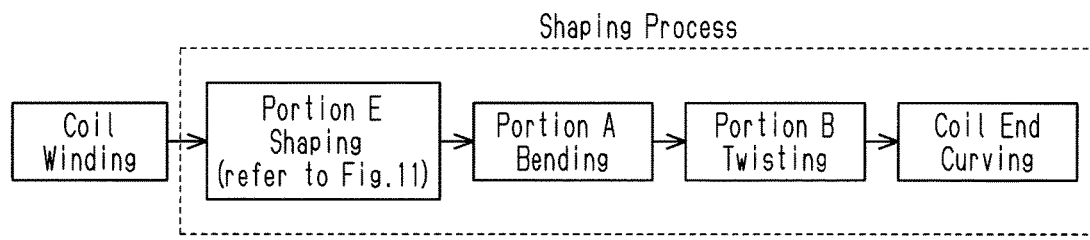
FIG. 12 is a process chart showing a formation process of a coil in a further example.
Figure 13:
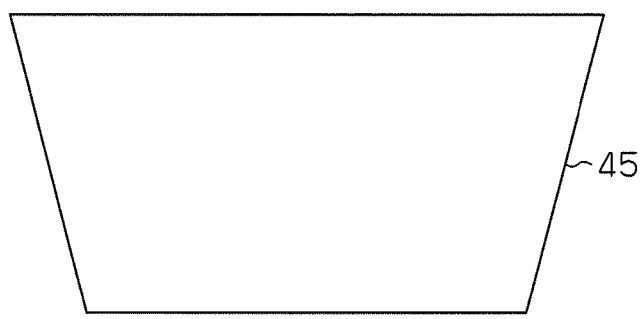
FIG. 13 is a profile diagram showing a winding frame used to form a coil in a further example.

The coil may be formed by the process of FIG. 12 instead of the process of FIG. 8. Here, a winding frame 45 shown in FIG. 13 is used in lieu of the winding frame 40 shown in FIG. 9. The winding frame 45 shown in FIG. 13 has a trapezoidal shape and does not include the recess 40a of the winding frame 40 shown in FIG. 9. In the process of FIG. 12, during coil winding, a rectangular wire is wound around the winding frame 45. In the shaping process, a recess shown at section E in FIG. 11 is shaped. Then, in the same manner as FIG. 8, the curved portion A is formed (portion A bending), the twisted portion B is formed (portion B twisting), and the coil end is curved.

Figure 14:
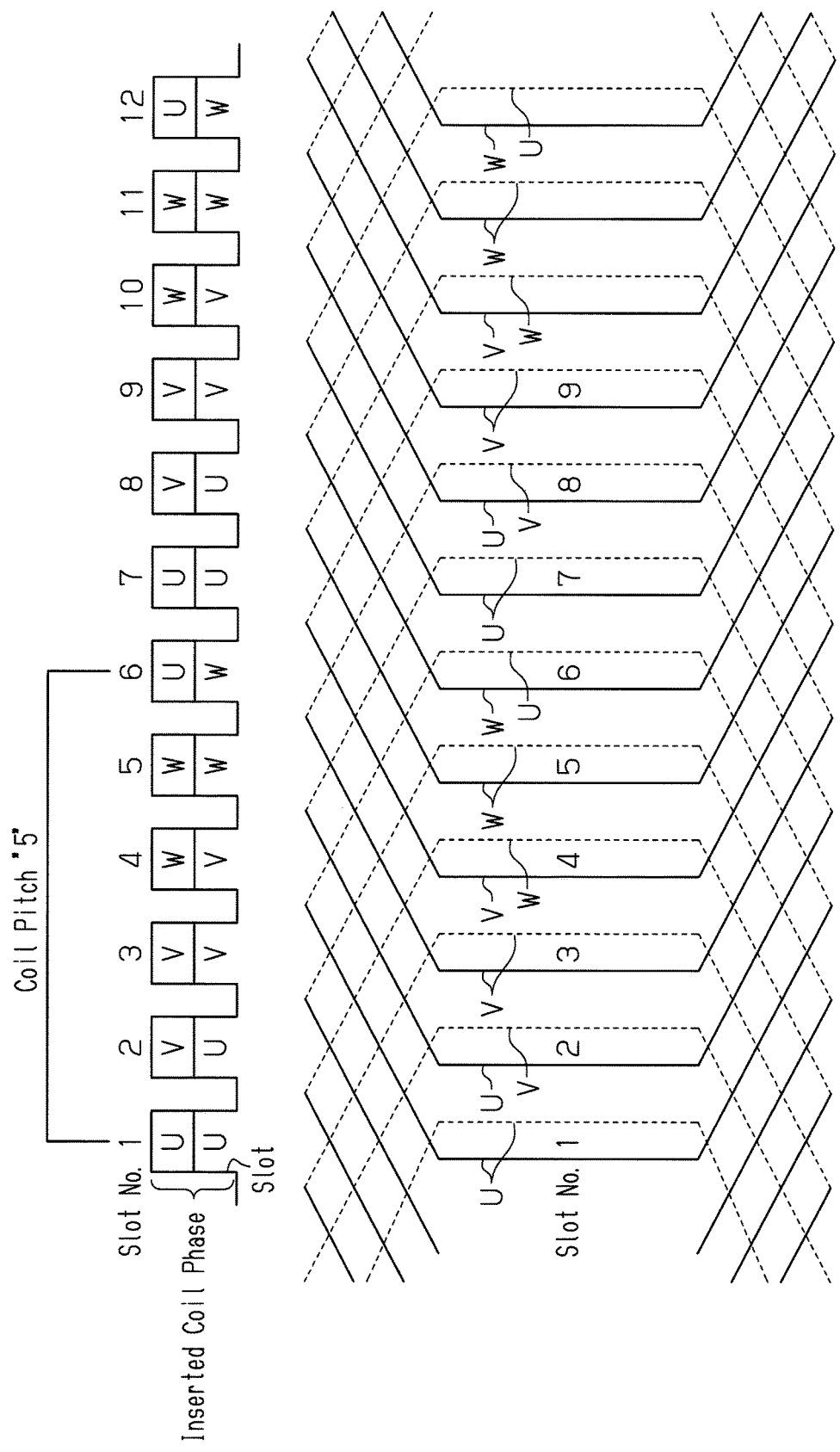
FIG. 14 is a schematic diagram showing slots, coils, and the connected state of the coils when spreading out the stator of another example.

Instead of FIG. 7, as shown in FIG. 14, two coils may be inserted into a single slot and the coil pitch may be "five". For example, in FIG. 14, the phases of the inserted coils in slot number 1 are a U phase coil and a U phase coil. The phases of the inserted coils in slot number 2, which is adjacent to the right of slot number 1, are a V phase coil and a U phase coil. The phases of the inserted coils in slot number 3, which is adjacent to the right of slot number 2, are a V phase coil and a V phase coil.

A rectangular wire having a rectangular cross-section is used as the conductive wire of the coil. However, there is no such limitation, and round wires having circular cross-sections may be aligned and wound.

The convex in the connection portion of the coil does not have to be arcuate as long as it is curved.

The curved portion A of the coil may include only section A1, which is bended in the circumferential direction.

The bent portion A of the coil is bent twice but may be bent three or more times.

The coil is formed to be a trapezoid but not limited to a trapezoid.

A second embodiment of the present invention will now be described with reference to FIGS. 16(a) to 25.

Figure 16A:
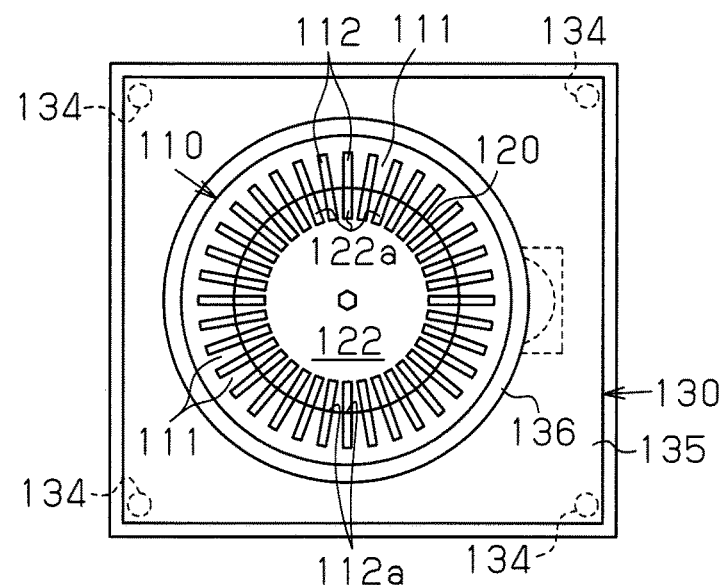
FIG. 16(a) is a schematic plan view showing a stator manufacturing apparatus according to a second embodiment of the present invention.
Figure 16B:
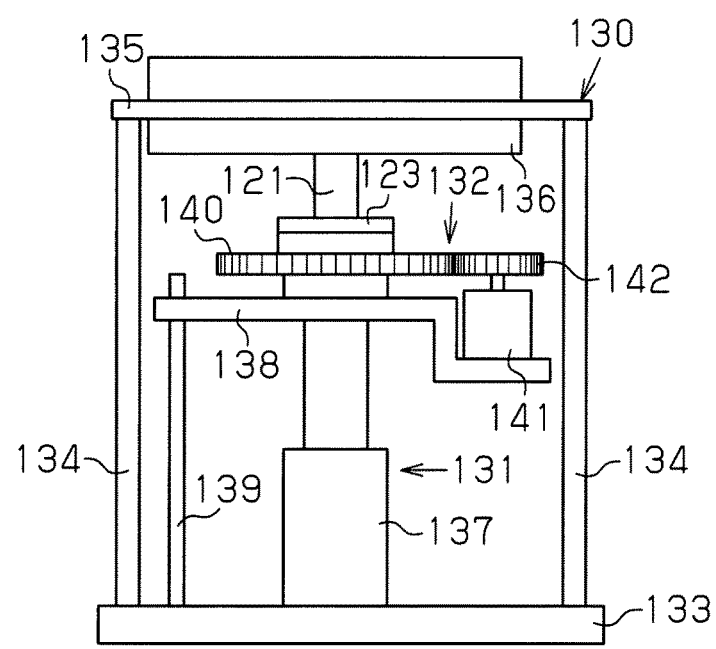
FIG. 16(b) is a schematic front view showing the apparatus of FIG. 16(a).

As shown in FIGS. 16(a) and 16(b), a stator manufacturing apparatus includes a support 130, a lifting device 131, and a pivoting device 132. The support 130 supports a stator core 110. The lifting device 131 lifts and lowers a holding jig 120 in a state in which the axis of the holding jig 120 is aligned with the axis of the stator core 110, which is supported by and fixed to the support 130. The pivoting device 132 pivots the holding jig 120, which is supported on the lifting device 131.

The stator core 110 is formed to be annular and has an inner circumference including a plurality of teeth 111 arranged in fixed intervals. Each tooth 111 has a center line that lies along a straight line extending radially from the center of the stator core 110. A slot 112 is formed between adjacent teeth 111. In detail, the stator core 110 includes a plurality of slots 112, and each slot 112 includes an opening 112a that opens in the inner circumference of the stator core 110. The stator core 110 has a slot pitch that widens from the openings 112a toward the bottom of the slots 112. The slot pitch refers to the distance between the center lines of two adjacent slots 112. In this manner, the slots 12 extend radially from the openings 112a.

Figure 17:
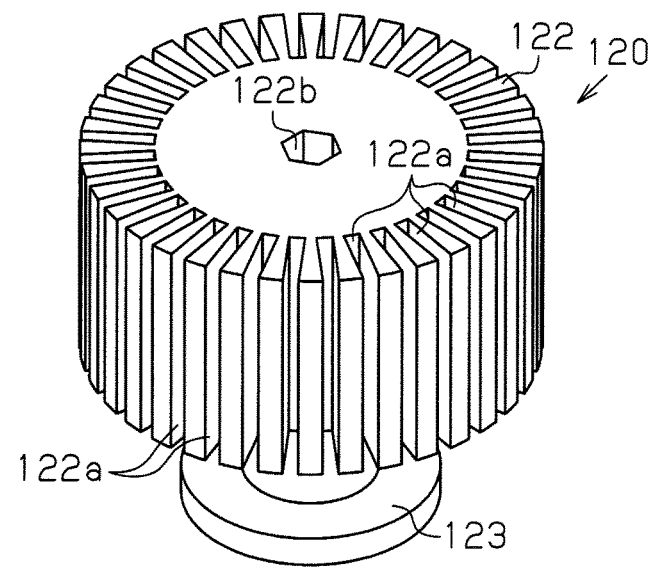
FIG. 17 is a schematic perspective view showing a holding jig of FIG. 16(a).

As shown in FIG. 17, the holding jig 120 includes a rod 121 and a main body 122, which is fixed to the top end of the rod 121 and formed to be generally cylindrical. A circular plate-shaped fastening portion 123, which fixes the holding jig 120 onto the pivoting device 132, is formed on the bottom end of the rod 121. The circumferential surface of the main body 122 includes a plurality of holding grooves 122a formed in a state extending along the radial direction of the main body 122. The holding grooves 122a are formed with a pitch that is the same as the pitch of the openings 112a of the slots 112. The holding jig 120 is formed so that it can be arranged at the inner side of the stator core 110 and the holding grooves 122a are arranged opposing the openings 112a of the slots 112 in the stator core 110.

As shown in FIGS. 16(a) and 16(b), the support 130 includes a support plate 135, which is fixed to upper portions of four rods 134 arranged on a base 133. An accommodation support body 136, which can accommodate the stator core 110, is fixed to the support plate 135. The accommodation support body 136 is generally cylindrical and has a closed bottom. The accommodation support body 136 has an inner diameter that is substantially equal to the outer diameter of the stator core 110. The bottom of the accommodation support body 136 includes a hole allowing for the passage of the main body 122 of the holding jig 120 and a first side of a coil, which is coupled to the holding jig 120 and which will be described later.

As shown in FIG. 16(b), the lifting device 131 includes a lifting support body 138, which can be lifted and lowered by a hydraulic cylinder 137 arranged on the base 133. The lifting support body 138 includes a step and is guided by a guide rod 139, which is arranged on the base 133, when lifted and lowered.

The pivoting device 132 is arranged on the lifting support body 138 and includes a gear body 140 supported to be rotatable relative to a support shaft (not shown) formed on the lifting support body 138. The support shaft is formed so that the axis of the support shaft is aligned with the axis of the stator core 110 in a state in which the stator core 110 is accommodated in the accommodation support body 136. The fastening portion 123 of the holding jig 120 is coupled in a removable manner to the upper surface of the gear body 140. A servo motor 141, which drives the gear body 140, is fixed to the lifting support body 138. A gear 142, which is engaged with the gear body 140, is fixed to the output shaft of the servo motor 141. Accordingly, when the servo motor 141 is driven in a state in which the holding jig 120 is fixed at the fastening portion 123 to the gear body 140, the holding jig 120 rotates relative to the stator core 110 in concentricity with the stator core 110, which is accommodated in the accommodation support body 136. The servo motor 141 is controlled by a controller (not shown).

Figure 19A:
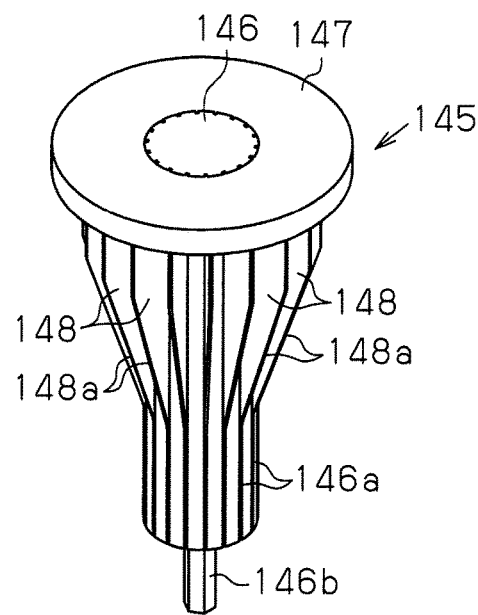
FIG. 19(a) is a schematic perspective view showing a pushing portion.
Figure 19B:
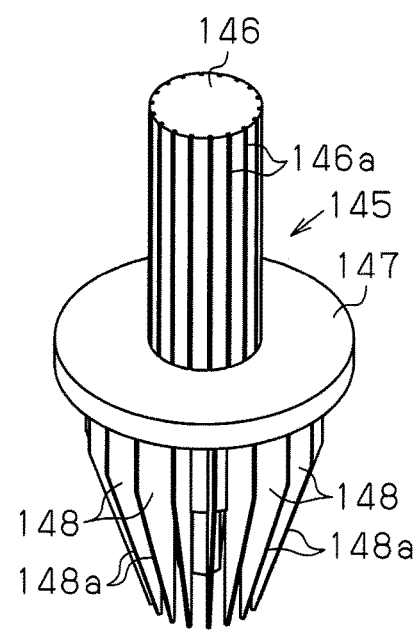
FIG. 19(b) is a schematic perspective view showing a pushing portion when the pusher is in a moved state.

The manufacturing apparatus includes a pushing tool 145 as shown in FIGS. 19(a) and 19(b). In a state in which the holding jig 120 is arranged at the inner side of the stator core 110 and a coil, which will be described later, is set between the stator core 110 and the holding jig 120, the pushing tool 145 is used when moving the coil from the holding jig 120 to the stator core 110. The pushing tool 145 includes a guide shaft 146. Guide grooves 146a, which extend in the axial direction, are formed in the circumference of the guide shaft 146 at equal intervals along the circumferential direction. The guide shaft 146 has a lower end including a projection 146b that can be fitted to a fitting recess formed in the upper surface of the main body 122 of the holding jig 120.

An annular pushing body 147 is attached to the circumference of the guide shaft 146 and is slidable along the guide grooves 146a. The pushing body 147 has an inner circumference including inner teeth, which are fitted to the guide grooves 146a of the guide shaft 146. Plate-shaped pushers 148 are coupled to the lower surface of the pushing body 147. Each pusher 148 is fitted into a corresponding guide groove 146a of the guide shaft 146 and radially coupled to the guide shaft 146. The pusher 248 includes a lower portion defining a tapered pushing portion 148a, which is gradually narrowed toward the guide shaft 146. More specifically, the pusher 148 includes the pushing portion 148a in which the distance to the axis decreases as the distal end becomes closer. In the second embodiment, the guide grooves 146a of the guide shaft 146 and the pushers 148 are formed so that their number and pitch are the same as the holding grooves 122a of the holding jig 120. To facilitate illustration, in FIGS. 19(a) and 19(b), the number of the guide grooves 146a and the pushers 148 is shown in a state less than the number of the holding grooves 122a.

Although not shown in the drawings, the manufacturing apparatus includes a downward pushing device that functions to push the pushing body 147 downward in a state in which the holding jig 120 is arranged at a predetermined position at the inner side of the stator core 110, which is supported by the accommodation support body 136, and the pushing tool 145 is arranged on the upper surface of the holding jig 120.

Figure 20A:
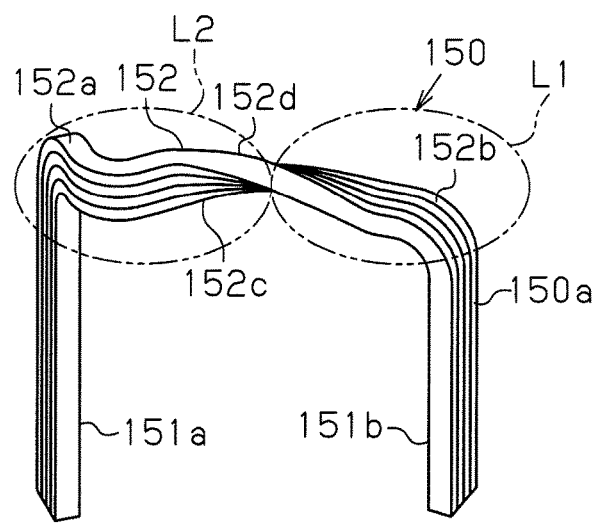
FIG. 20(a) is a schematic partial perspective view showing a coil.
Figure 20B:
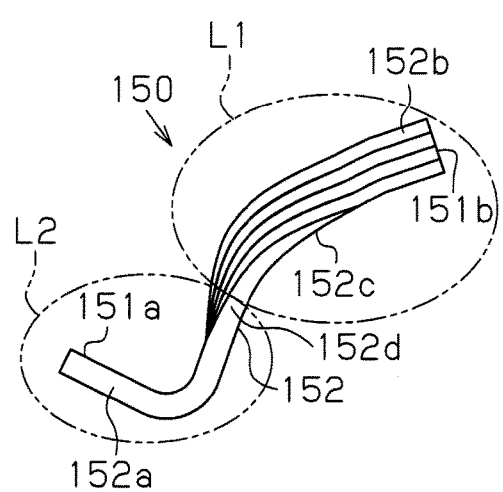
FIG. 20(b) is a schematic plan view showing the coil.

As shown in FIGS. 20(a) and 20(b), a coil 150 uses rectangular wires as conductive wires 150a. Edgewise bending is performed to wind the conductive wires 150a. The coil 150 includes a first side 151a and second side 151b, which are straight portions extending parallel to each other, and one set of coil ends 152, which are continuous with the first side 151a and second side 151b. The set of coil ends 152 are formed to be symmetric relative to a plane perpendicular to the first side 151a and second side 151b. FIG. 20(a) shows an upper half of the coil 150.

The coil 150 is formed so that the positional relationship of the first side 151a and the second side 151b correspond to a state when insertion into the slots 112 is completed. Here, the term "correspond to" includes complete conformation and substantial conformation (in particular, when slightly wider than the interval between the slots 112). The two coil ends 152 are formed so that they can absorb changes in the distance between the first side 151a and the second side 151b. In detail, a coil end 152 includes a first bent portion 152a, which is bent from an end of the first side 151a toward the radial direction of the stator core 110, a second bent portion 152b, which is bent from an end of the second side 151b toward a circumferential direction of the stator core 110, and a joining portion 152c, which has a first end that is continuous with the first bent portion 152a and a second end continuous with the second bent portion 152b and which extends in the circumferential direction of the stator core 110.

The joining portion 152c includes a twisted portion 152d, which is located at an intermediate position, a first portion L2, which is located toward the first bent portion 152a from the twisted portion, and a second portion L1, which is located toward the second bent portion 152b from the twisted portion. The first portion L2 does not overlap with the adjacent coil end in the axial direction of the stator S, and the second portion L1 overlaps with the adjacent coil end in the axial direction of the stator S. The first bent portion 152a is bent to generally form an arc that is one quarter of a circle. Further, the twisted portion is formed near the middle of the joining portion 152c, and the joining portion 152c is twisted by about 90 degrees at the twisted portion 152d.

By shaping the coil end 152 as described above, the joining portion 152c includes a portion that overlaps with the joining portion 152c of the adjacent coil end 152 in the axial direction of the stator and a portion that does not overlap with the joining portion 152c of the adjacent coil end 152 in the axial direction of the stator. When all of the coils 150 are coupled to the stator core 110, each coil 150 has the same coil end length (projecting length of the coil end 152 from the end surface of the stator core 110). In FIGS. 20(*a*) and 20(*b*), the portion encircled by the double-dashed line of L1 is the portion (second portion) where the joining portions 152*c* overlap in the axial direction of the stator, and the portion encircled by the double-dashed line of L1 is the portion (second portion) where the joining portions 152*c* do not overlap in the axial direction of the stator (first portion).

Figure 22:
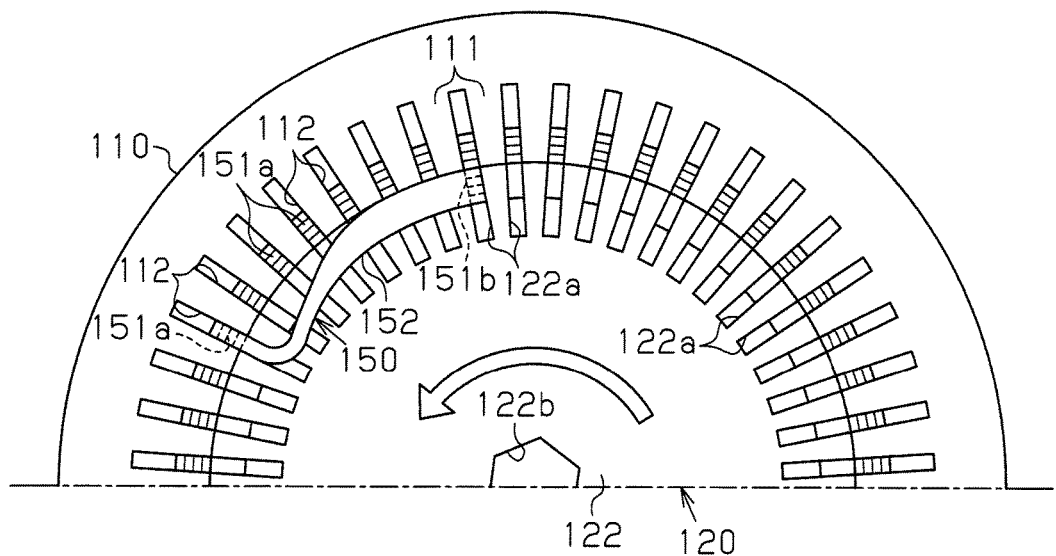
FIG. 22 is a schematic plan view showing a state in which a coil is inserted into a stator core and a holding jig.

FIG. 22 shows a state in which the holding jig 120 is arranged at the inner side of the stator core 110, the first sides 151*a* are inserted into the slots 112, and the second sides 151*b* are inserted into the holding grooves 122*a*. When viewing the stator core 110 along the axial direction, the coil end 152 includes the first portion, which is located in the range of the slots 112 into which the first sides 151*a* are inserted, and the second portion other than the first portion. The second portion is located on the end surface of the holding jig 120 at a portion where the holding grooves 122*a* are formed.

A method for manufacturing a stator using the above manufacturing apparatus will now be described.

Figure 21:
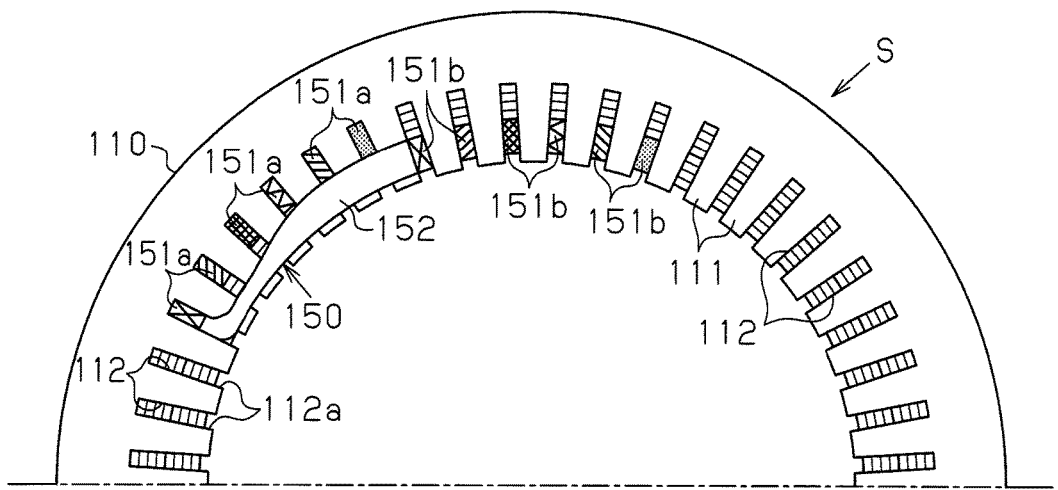
FIG. 21(a) is a schematic plan view showing part of the stator.
FIG. 21(b) is a schematic diagram showing the relationship of a first side and second side of the coil for each phase inserted into a slot.
Figure 21:
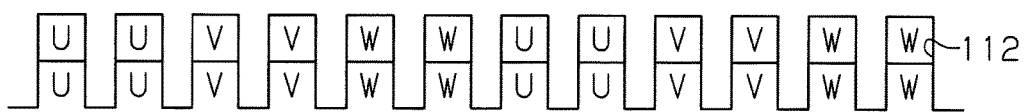

As shown in FIG. 21(*a*), the stator S of the second embodiment includes forty-eight slots. Each coil 150 is coupled to the stator core 110 so that the interval between the first side 151*a* and the second side 151*b* is a six-slot pitch, that is, five slots 112 are arranged between the slot 112 in which the first side is inserted and the slot 112 in which the second side 151*b* is inserted. Further, each coil 150 is coupled to the stator core 110 to form a two layer winding in which the first side 151*a* is inserted into the inner side (proximal to the bottom) of the slot 112 and the second side 151*b* is inserted proximal to the opening 112*a* of the slot 112. FIG. 21(*a*) shows one half of the stator S and shows only the coil end 152 of one coil 150. To facilitate understanding of the relationship of the first side 151*a* and the second side 151*b* in adjacent coils 150, six of the coils 150 are illustrated with different patterns with the first side 151*a* and second side 151*b* of the same coil 150 having the same pattern.

As shown in FIG. 21(*b*), the ends of the conductive wires in the coils 150 are connected so that the U phase, V phase, and W phase sequentially change in a state in which the first side 151*a* and second side 151*b* in the coils 150 of the same phase are inserted into two successive slots 12.

When manufacturing the stator S, first, in a state in which the holding jig 120 is removed from the gear body 140, the first sides 151*a* of the coils 150 are arranged at the outer side of the main body 122 and the second sides 151*b* are inserted into the holding grooves 122*a* so that the coil ends 152 substantially extend along the outer circumference of the main body 22. Then, the holding jig 120 is fixed to the gear body 140 in a state in which the lifting support body 138 of the lifting device 131 is arranged at a lowered position. The coils 150 may be coupled to the holding jig 120 in a state in which the holding jig 120 is not removed from the gear body 140 and is fixed to the gear body 140. Further, the stator core 110 is fixed to the accommodation support body 136 of the support 130. In this state, the holding jig 120 is located under the stator core 110 in a state in which the axis of the stator core 110 is concentric with the axis of the holding jig 120.

Next, the lifting device 131 is lifted and driven to arrange the holding jig 120, to which the coils 150 are coupled as described below, inside the stator core 110. Further, the first sides 151*a* of the coils 150 are set in a state inserted into the slots 112 of the stator core 110. More specifically, in a state in which the axes of the holding jig 120 and the stator core 110 are aligned along the same line, the holding jig 120 and the stator core 110 are relatively moved along the axial direction, and the first sides 151*a* are moved along the axial direction of the stator core 110 and inserted into the slots 112. In a state in which the holding jig 120 is arranged inside the stator core 110, the first sides of the coils 150 are inserted into the slots 112 and the second sides 151*b* are set in a state inserted into the holding grooves 122*a*.

Figure 18:
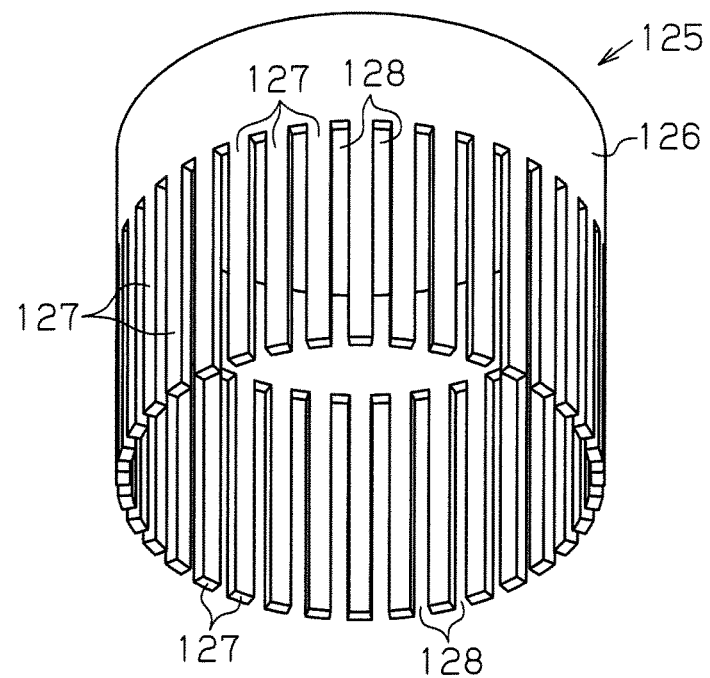
FIG. 18 is a schematic perspective view showing an auxiliary jig.

In detail, for example, an auxiliary jig 125 shown in FIG. 18 is used. The auxiliary jig 125 is cylindrical and has an outer diameter that is the same as the diameter of the main body 122 of the holding jig 120. The auxiliary jig 125 includes a basal portion 126 and plate-shaped blades 127, which extend from the basal portion 126 toward the distal end parallel to axial direction. A slit-shaped gap 128 having the same width as the holding grooves 122*a* is formed between adjacent blades 127. The auxiliary jig 125 is arranged so that the ends of the blades 127 contact the upper end surface of the holding jig 120. In this state, the first sides 151*a* of the coils 150 held by the holding jig 120 as described above are inserted into the corresponding gaps 128 of the blades 127 and held in a state corresponding to the predetermined slots 112 of the stator core 110.

In this state, when the lifting device 131 is driven and the lifting support body 138 is lifted, the holding jig 120 and the auxiliary jig 125 is lifted. During the lifting, the basal portion 126 of the auxiliary jig 125 is inserted inside (inner circumferential side) the stator core 110. Then, the first sides 151*a* of the coils 150 are inserted into portions near the openings 112*a* of the slots 112. In a state in which the holding jig 120 is arranged inside the stator core 110, the coil ends 152 are shaped so that portions other than the portions located within the ranges of the slots 112 into which the first sides 151*a* are inserted are located on the end surface of the portion where the holding grooves 122*a* of the holding jig 120 are formed. Thus, the holding jig 120 is inserted into and arranged at the inner side of the stator core 110 without interference between the coil ends 152 and the stator core 110. When the lifting of the lifting device 131 ends, the insertion of the first sides 151*a* of the coils 150 into the slots 112 is completed. Then, the auxiliary jig 125 is removed.

Each coil 150 is formed so that the positional relationship between the first side 151*a* and the second side 151*b* correspond to a state when completely inserted into the slots 112. The slot pitch is the smallest at the opening 112*a* of each slot 112 and the largest at the bottom of each slot 112. Thus, in a state in which the setting described above is completed, as shown in FIG. 22, the second side 151*b* of each coil 150 is not in a state opposed to the slot 112 that it should be inserted into, that is, the slot 112 separated by a six-slot pitch from the slot 112 into which the first side 151*a* of the same coil 150 is inserted. In FIG. 22, the second side 151*b* is in a state opposing the slot 112 that is separated by a seven-slot pitch from the slot 112 into which the first side 151*a* is inserted.

Figure 23:
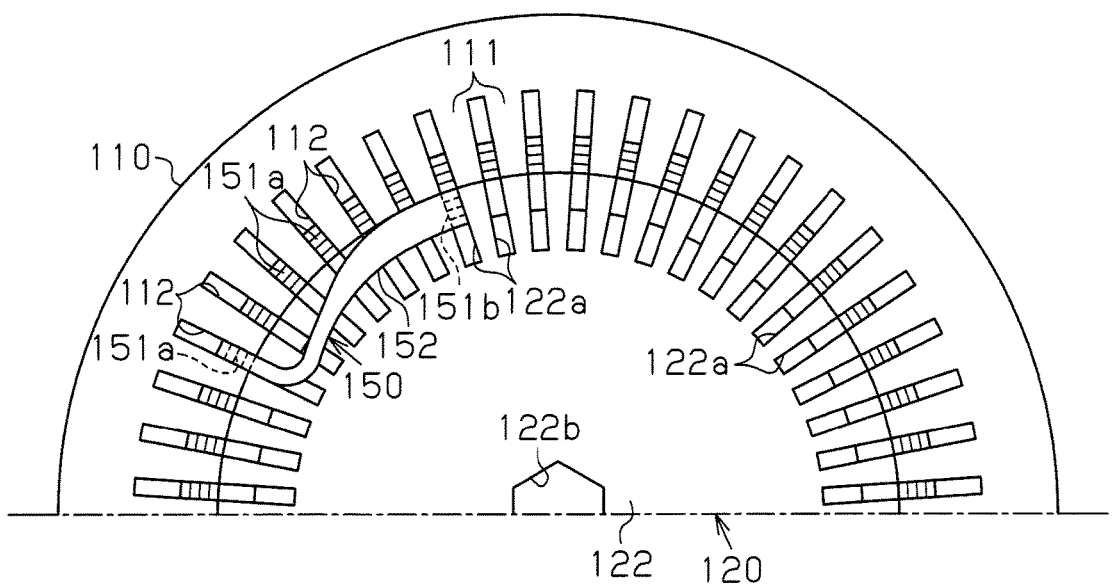
FIG. 23 is a schematic plan view corresponding to FIG. 22 and showing a state after the holding jig is pivoted.

Next, the servo motor 141 of the pivoting device 132 is driven. When the stator core 110 is in a fixed state, the holding jig 120 is pivoted by a predetermined amount. As shown in FIG. 23, this positions the second side 151*b* of each coil 150 in a state opposing the slot 112 into which it should be inserted, that is, in a state opposing the slot 112 separated by a six-slot pitch from the slot 112 into which the first side 151*a* is inserted. In this state, the two coil ends 152 flex and thereby shorten the distance between the first side 151*a* and the second side 151*b* from the initial state, and the change in the distance between the first side 151*a* and the second side 151*b* is absorbed. Thus, the coil 150 is deformed without any problems. Further, due to the coil end 152 in the flexed state, the first side 151a and the second side 151b are in a state urged so that the distance therebetween increases.

Then, the pushing tool 145 is used to apply force to the coils 150 to eject the second sides 151b, which are inserted in the holding grooves 122a, out of the holding grooves 122a and into the corresponding slots 112. This inserts the second sides 151b into the slots 112 of the stator core 110. In detail, the pushing tool 145 is arranged in a state in which the projection 146b of the guide shaft 146 is fitted to the fitting recess 122b of the holding jig 120. In this state, the pushing body 147 is lowered with the pushing device of the manufacturing apparatus. As a result, the pusher 148 is lowered together with the pushing body 147 along the guide grooves 146a of the guide shaft 146, and the pushing portions 148a enter the holding grooves 122a.

Figure 24:
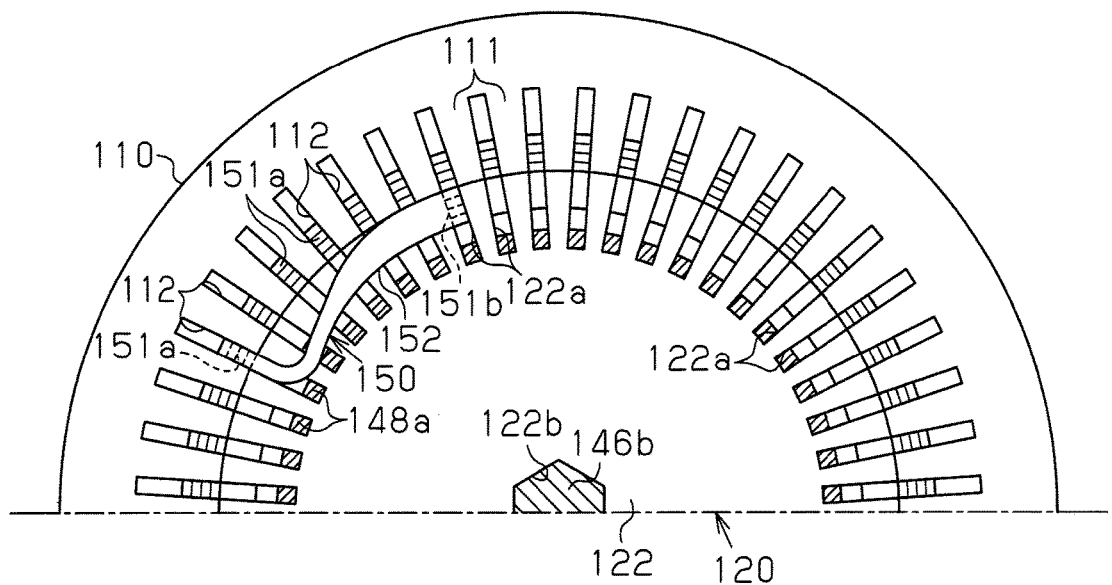
FIG. 24 is a schematic plan view showing a state in which a pusher is in contact with a coil end.

Then, as shown in FIG. 24, from a state in which the pushing portions 148a are in contact with the coil ends 152, when the pushing body 147 is further lowered, force is applied to the coils 150 to eject the second sides 151b, which are inserted in the holding grooves 122a, out of the holding grooves 122a and into the corresponding slots 112. This inserts the second sides 151b into the slots 112 of the stator core 110. Further, the first sides 151a inserted into the slots 112 near the openings 112a are also moved to the inner sides of the slots 112. In a state before the pusher 148 applies a pushing force to the coil ends 152, when viewing the stator core 110 in the axial direction, part of each joining portion 152c is formed so that the rear end surface of the second side 151b of each coil 150 overhangs out of a range of movement. The rear end surface of the second side 151b refers to the surface of the second side 151b opposing the inner side of the holding groove 122a. Further, the range of movement refers to the range in which the second side 151b is pushed by the pusher 148 and moved to a predetermined position of the slot 112. Thus, when each side 151b is completely ejected out of the holding groove 122a by the pushing portion 148a, the pushing force of the pusher 148 moves the joining portion 152c to a predetermined insertion position as the stator core 110 is bent outward in the radial direction.

When the coil end 152 is in a flexed state, the first side 151a and the second side 151b are urged so that the distance therebetween is increased. Thus, the pusher 148 applies force that ejects the second sides 151b out of the holding grooves 122a into the corresponding slots 112. As the first sides 151a and the second sides 151b move toward the bottom of the slots 12, the coil ends 152 function to increase the distance between the first sides 151a and the second sides 151b. Accordingly, the coils 150 are not forcibly deformed even when deforming and inserting the coils 150, which are formed by rectangular wires and require a large force for deformation, into the slots 112 of the stator core 110. Thus, deformation and damage of the stator core 110 can be prevented, and the separation of an insulative coating from the conductive wires 150a can be prevented.

Figure 25:
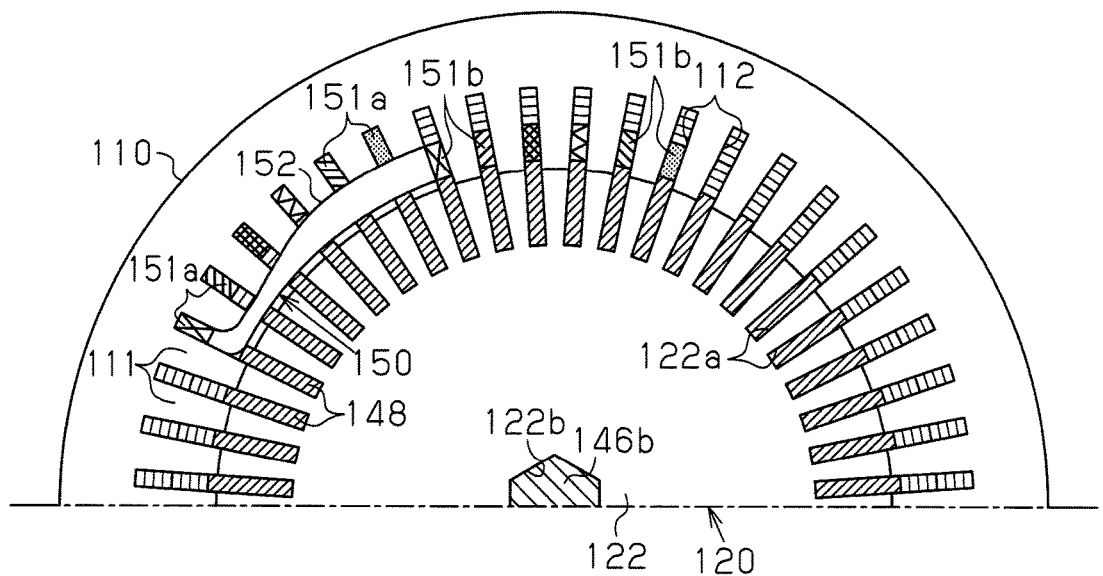
FIG. 25 is a schematic plan view showing a state in which a first side and a second side are inserted to a predetermined position.

Then, when the pushing body 147 is completely lowered, as shown in FIG. 25, the pushers 148 are in a state having caused the first sides 151a to be in contact with the bottom of the slots 112 and the second sides 151b to be inserted into the slots 112 to a position where the second sides 151b contact the first sides 151a of the other coils 150, and the coils 150 are coupled to the stator core 110 in two layer windings.

Next, the lowering device is returned to its original standby position. After, the pushing tool 145 is removed from the holding jig 120, the lifting device 131 is driven to lower the holding jig 120 together with the lifting support body 138 to below the accommodation support body 136.

Then, the stator core 110, into which the coils 150 are arranged at predetermined positions in the slots 112, is removed from the accommodation support body 136. Further, the ends of the conductive wires 150a of the coils 150 are connected to complete the stator S.

The slot pitch is smallest at the openings 112a of the slots 112 and largest at the bottom of the slots 112. The coils 150 are formed so that the distance between the first side 151a and the second side 151b in a free state is substantially the same as the distance between the openings 112a of the slots 112 in which they should be inserted. When the first sides 151a and the second sides 151b are simply ejected toward the inner sides (bottom sides) of the slots 112, in a state in which the first sides 151a and the second sides 151b are in contact with the wall surfaces of the slots 112, reaction force from the wall surfaces of the slots 112 moves the first sides 151a and the second sides 151 while increasing the distance therebetween. Thus, when bundling a number of round wires into a flat shape as the conductive wires 150a forming the coil 150 and applying resin to maintain the flat shape or when using rectangular wires or conductive wires around which a synthetic resin insulative sheet is wound, the coils 150 may be deformed or damaged.

However, the coils 150 are formed in advance so that the positional relationship between the first sides 151a and the second sides 151b correspond to a state when insertion into the slots 112 is completed. In the positional relationship, the holding jig 120 is arranged at the inner side of the stator core 110, the first sides 151a of the coils 150 are inserted into the slots 112, and the second sides 151b are set in a state inserted into the holding grooves 122a of the holding jig 120. Then, the stator core 110 and the holding jig 120 are relatively rotated, and the holding grooves 122a are positioned in a state opposing the slots 112 into which the second sides 151b inserted in the holding grooves 122a should be inserted. Here, the coil end 152 flexes and shortens the distance between the first side and the second side 151b. However, due to the flexed coil end 152, the first side 151a and the second side 151b are in a state urged in a direction increasing the distance therebetween. Thus, when the pushing tool 145 applies force to the coils 150 ejecting the second sides 151b out of the holding grooves 122a and into the corresponding slots 112, as the first sides 151a and the second sides 151b move toward the bottom of the slots 112, the coil ends 152 function to increase the distance between the first sides 151a and the second sides 151b. Accordingly, there are few limitations to the designing of a electric rotating machine. Further, even when deforming a coil such as the coil 150, which is formed from rectangular wires and requires a large force for deformation, to insert the coil into the slot 112 of the stator core 110, deformation and damage of the stator core 110 can be prevented.

The second embodiment has the advantages described below.

(5) In the stator manufacturing method, the holding jig 120 is used. The holding jig 120 can be arranged inside the stator core 110 in a state in which the holding grooves 122a are opposed to the openings 112a of the slots 112 of the stator core 110. Further, the coil used as the coil 150 is formed in advance by the conductive wires 150a. Further, the coil 150 is formed so that the positional relationship between the first side and the second side 151b corresponds to a state in which insertion into the slots 112 is completed, and the coil 150 can absorb changes in the distance between the first side 151a and the second side 151b. When viewing the stator core 110 in a state in which the holding jig 120 is arranged in the stator core 110, the first sides 151a are inserted into the slots 112, and the second sides 151b are inserted into the holding grooves 122a, at least one of the coil ends 152 includes a first portion arranged in a range of the slot 112 in which the first side 151a is inserted and a second portion other than the first portion, and the second portion is located on the end surface of the holding jig 120 on the portion where the holding grooves are formed. Further, the second sides 151b are inserted into the holding grooves 122a of the holding jig 120, and the holding jig 120 and the stator core 110 are relatively moved along the axial direction in a state in which the axes of the holding jig 120 and the stator core 110 are aligned to insert the first sides 151a into the slots 112. This sets the holding jig 120 in a state arranged inside the stator core 110. Then, the stator core 110 and the holding jig 120 are relatively rotated to position the holding grooves 122a to oppose the slots 112 into which the second sides inserted in the holding grooves 122a are to be inserted. In this state, the pushing tool 145, which serves as an ejecting portion, applies force to the coils 150 ejecting the second sides 151b out of the holding grooves 122a and into the corresponding slots 112 of the stator core 110. Accordingly, the coil ends 152 do not include parts located inward in the radial direction from the stator core. This reduces design limitations for an electric rotating machine. Further, before inserting the coils 150 into the slots 112, the coils 150 are formed in advance to have the shape for insertion or a shape close to the shape for insertion. Thus, there is no need to greatly deform the coil 150. This differs from the method described in patent publication 4. Thus, the insertion of the coils 150 into the slots 112 is facilitated. Further, even when inserting the coils 150, which are formed by rectangular wires and require a large force for deformation, into the slots 112 of the stator core 110, deformation and damage of the stator core 110 can be prevented. Further, separation of an insulative coating from the conductive wires 150a can be prevented.

(6) In a state in which the first sides 151a of the coils 150 are arranged at the outer side of the holding jig 120 and the second sides 151b are inserted in the holding grooves 122a, the coil ends 152 of the coils 150 are arranged to extend along the circumferential direction of the holding jig 120. Further, the auxiliary jig 125, which includes the blades 127 respectively arranged in correspondence with the teeth 111 of the stator core 110, is arranged on an end surface of the holding jig 120, and the first sides 151a of the coils 150 are arranged between the corresponding blades 127. The holding jig 120 is inserted into the stator core 110 from the auxiliary jig 125 to push the first side 151a of each coil 150, which is guided by the auxiliary jig 125, into the corresponding slot 112 of the stator core 110. This sets the coils 150 on the stator core 110 and the holding jig 120. In a state in which the second sides 151b of the coils 150 are inserted into the holding grooves 122a of the holding jig 120, to relatively move the holding jig 120 and the stator core 110 in the axial direction and arrange the first sides 151a in the inner side of the stator core 110 while inserting the first sides into the slots 112, the first sides 151a projecting out of the circumference of the holding jig 120 are all required to be in a state opposing the slots 112. However, due to the tolerated error of the coils 150 and the holding jig 120 during manufacturing, in a state in which the second sides 151b are inserted into the holding grooves 122a, the second sides 151b are somewhat loose in the holding grooves 122a. Thus, when the second sides 151b are just inserted into the holding grooves 122a of the holding jig 120, the first sides 151a will not necessarily be in a state opposing the slots 112, and it will be difficult to obtain a state in which the first sides 151a are all opposed to the slots 112. However, in this embodiment, each of the first sides 151a is guided by the auxiliary jig 125 to reach a position opposing the corresponding slot 112. This facilitates setting to a state in which the first sides 151a of the coils 150 are inserted into the slots 112 of the stator core 110 and the second sides 151b are inserted into the holding grooves 122a of the holding jig 120, which is arrange inside the stator core 110.

(7) As the ejecting portion, the pushing tool 145 is used, which includes the plate-shaped pushers 148 arranged radially in correspondence with the holding grooves 122a. Each pushing portion 148a includes the pushing portion 148a, which is formed so that the distance from the axis becomes smaller toward the distal end. The pushers 148 of the pushing tool 145 are inserted from the distal ends into the corresponding holding grooves 122a, and the second sides 151b of the coils 150 inserted in the holding grooves 122a are ejected outward in the radial direction of the holding jig 120 and inserted into the corresponding slots 112 of the stator core 110. Accordingly, the structure of the ejecting portion is relatively simple compared to when arranging the ejecting portion in the holding jig 125.

(8) Rectangular wires are used as the conductive wires 150a forming the coil 150. Accordingly, the space factor of the coil 150 is improved compared to when using conductive wires 150a having circular cross-sectional or elliptic cross-sections.

(9) The stator S includes the opening 112a, into which the slots 112 open toward the inner circumference, the annular stator core 110, which is formed so that the slot pitch increases from the opening 112a toward the bottom of the slots 112, and the coils 150, which are inserted into the slots 112. Each coil 150 includes the first side 151a and second side 151b, which are inserted into the slots 112, and one set of the coils ends 152, which are continuous with the first side 151a and second side 151b. The coil end 152 includes the first bent portion 152a, which is bent from one end of the first side 151a toward the radial direction of the stator core 110, the second bent portion 152b, which is bent from one end of the second side 151b toward the circumferential direction of the stator core 110, and the joining portion 152c, which extends along the circumferential direction of the stator core and has a first end that is continuous with the first bent portion 152a and a second end that is continuous with the second bent portion. Accordingly, the stator S can be manufactured with the manufacturing method described above. Further, even when deforming the coils 150, which are formed by rectangular wires and require a large force for deformation, when inserting the coils 150 into the slots 112 of the stator core 110, manufacturing can be performed without deforming or damaging the stator core 110.

(10) The joining portion 152c includes the twisted portion 152d, the first portion L2, which is located toward the first bent portion 152a from the twisted portion 152d, and the second portion L1, which is located toward the second bent portion 152b from the twisted portion. The first portion L2 is a portion that does not overlap with the adjacent coil end in the axial direction of the stator S, and the second portion L1 is a portion that overlaps with the adjacent coil end in the axial direction of the stator S. Accordingly, in adjacent coil ends 152, there are parts where the joining portions 152c do not overlap with each other in the axial direction of the stator core 110. Thus, the coil end length of the coil ends 152 can be decreased in comparison to when the joining portions 152c are overlapped with each other in the axial direction of the stator core 110 over their entire lengths.

(11) The set of coil ends 152 in each coil 150 is formed to be symmetric relative to a plane that is perpendicular to the first side 151a and the second side 151b. Accordingly, when the two coil ends 152 are deformed to decrease the distance between the first side 151a and the second side 151b or increase the distance from the decreased state, the deformation occurs more smoothly compared to when the coil ends 152 are formed to be asymmetric.

A third embodiment will now be described with reference to FIGS. 26 to 27(b). In the third embodiment, the structure of the ejecting portion of the manufacturing apparatus and the shape of the coil end 152 differs from the second embodiment. Otherwise, the structure is the same as the second embodiment. Parts that are basically the same as the second embodiment are given the same reference characters. Such parts will not be described in detail.

The ejecting portion of the third embodiment does not use the pushing tool 145. More specifically, when the holding jig 120 is arranged inside the stator core 110, and the second sides 151b, which are inserted into the holding grooves 122a, are in a state positioned opposing the slots 112 into which the second sides 151b should be inserted, the ejecting portion directly applies force to the second sides 151b to eject the second sides 151b out of the holding grooves 122a and into the corresponding slots 112.

Figure 26:
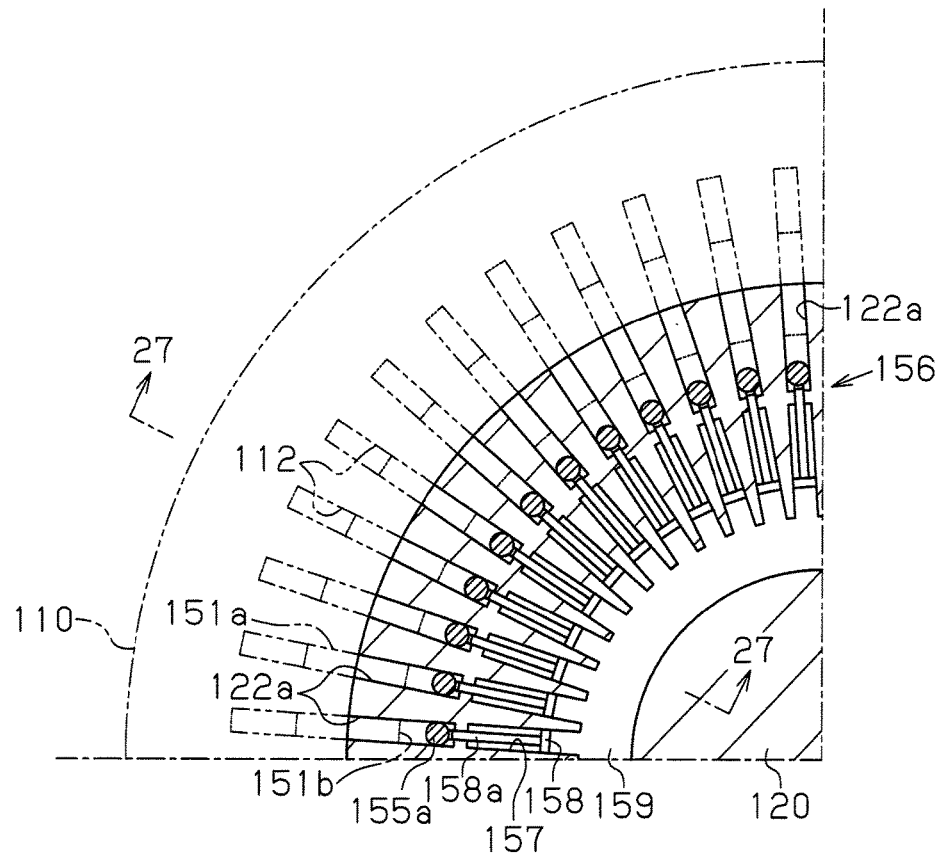
FIG. 26 is a schematic cross-sectional view showing an ejecting portion of a further embodiment.
Figure 27A:
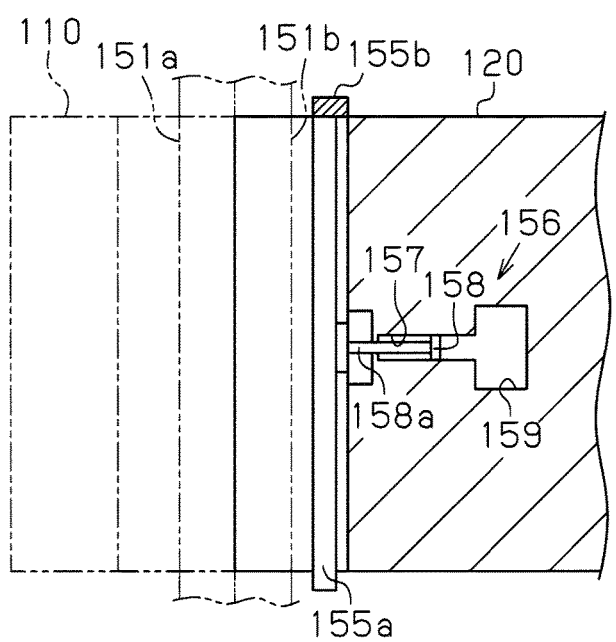
FIG. 27(a) is a cross-sectional view taken along line 27-27 in FIG. 26.
Figure 27B:
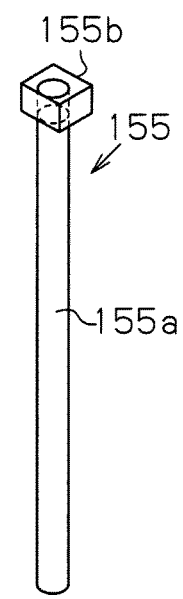
FIG. 27(b) is a perspective view showing an ejecting body.

For example, as shown in FIGS. 26, 27(a), and 27(b), the ejecting portion includes ejecting bodies 155, which are movable in the holding grooves 122a in the radial direction of the holding jig 120 in a state inserted into the holding grooves 122a, and ejecting force application portions 156, which apply ejecting force to the ejecting bodies 155 from the center of the holding jig 120 toward the circumference.

The ejecting bodies 155 each have a diameter that is substantially equal to the width of the holding groove 122a. Each ejecting body 155 includes a cylindrical pushing bar 155a, which is longer than the holding groove 122a in the vertical direction, and a head 155b, which is formed on the upper end of the pushing bar 155a. The ejecting force application portions 156 include piston accommodation portions 157, which are formed in the main body 122 extending in the radial direction in correspondence with the holding grooves 122a, pistons 158, which are accommodated in the piston accommodation portions 157, and a fluid passage 159, which can supply operation fluid to the piston accommodation portions 157. Each piston 158 is arranged so that a piston rod 158a extends into the holding groove 122a through a hole communicating the piston accommodation portion 157 and the holding groove 122a.

The coil end 152 is shaped so that the joining portion 152c does not directly receive the pushing force of the ejecting body 155. More specifically, when viewing the coil end 152 from an axial direction of the stator core 110 in a state in which the holding jig 120 is rotated and the second sides 151b inserted into the holding grooves 122a are positioned opposing the slots 112 in which the second sides 151b should be inserted, the joining portions 152c are shaped to be arranged within a range in which the second sides 151b of the coils 150 are to be moved.

Operational fluid is supplied to the fluid passage 159 in a state in which the first sides 151a are inserted into the slots 112, the second sides 151b are inserted into the holding grooves 122a, and the holding grooves 122a are positioned opposed to the slots in which the second sides 151b that are inserted in the holding grooves 122a are to be inserted. As a result, the pistons 158 moved toward the holding grooves 122a, the piston rods 158a move the ejecting along the holding grooves 122a toward the slots 112, and the pushing bars 155a of the ejecting bodies 155 directly apply force to the second sides 151b that eject the second sides 151b from the holding grooves 122a and into the corresponding slots 112. Further, when operational fluid is discharged from the fluid passage 159, a return spring (not shown) moves the piston rod 158a of each piston 158 toward a retraction side.

Accordingly, in addition to advantages (5), (6), and (8) to (11) of the second embodiment, the third embodiment has the advantages described below.

(12) The ejecting portion directly applies ejecting force to the second sides 151b. Accordingly, ejecting force is efficiently applied to the second sides 151b in comparison with when the ejecting portion directly applies ejecting force to the second sides 151b by applying ejecting force to parts other than the second sides 151b, for example, the coil ends 152.

(13) The ejecting portion includes the ejecting bodies 155, which are movable along the radial direction of the holding grooves 122a in a state inserted in the holding grooves 122a, and the ejecting force application portions 156, which apply ejection force to the ejecting bodies 155 from the center of the holding jig 120 toward the circumference. Accordingly, ejecting force can be applied to the second sides without interference with the coil ends 152.

The second and third embodiments may be modified as described below.

Figure 28:
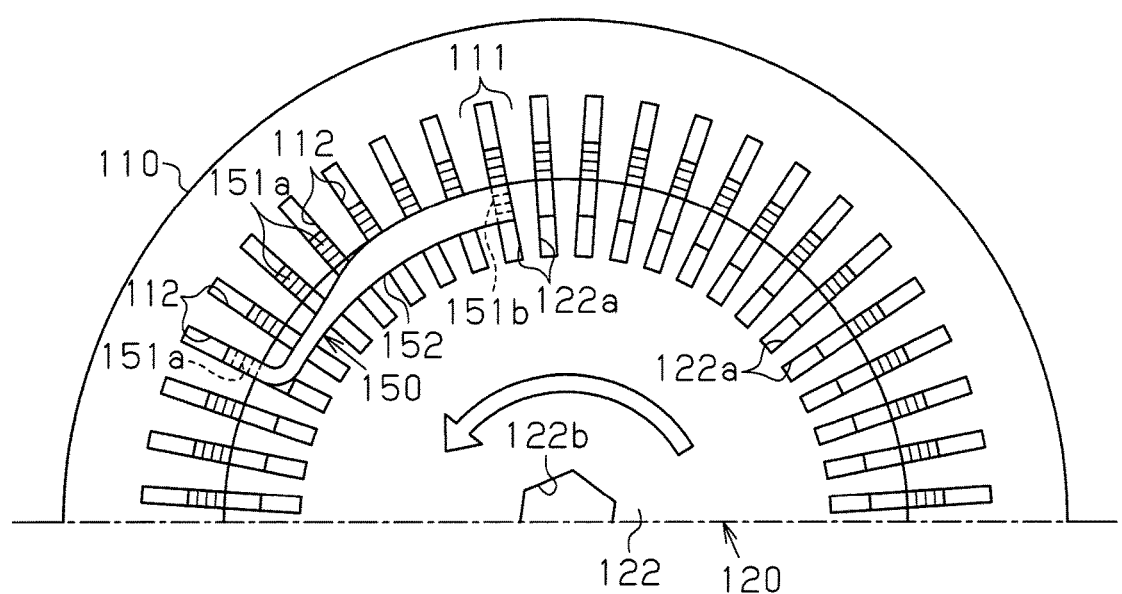
FIG. 28 is a schematic plan view corresponding to FIG. 22 showing a further embodiment.
Figure 29:
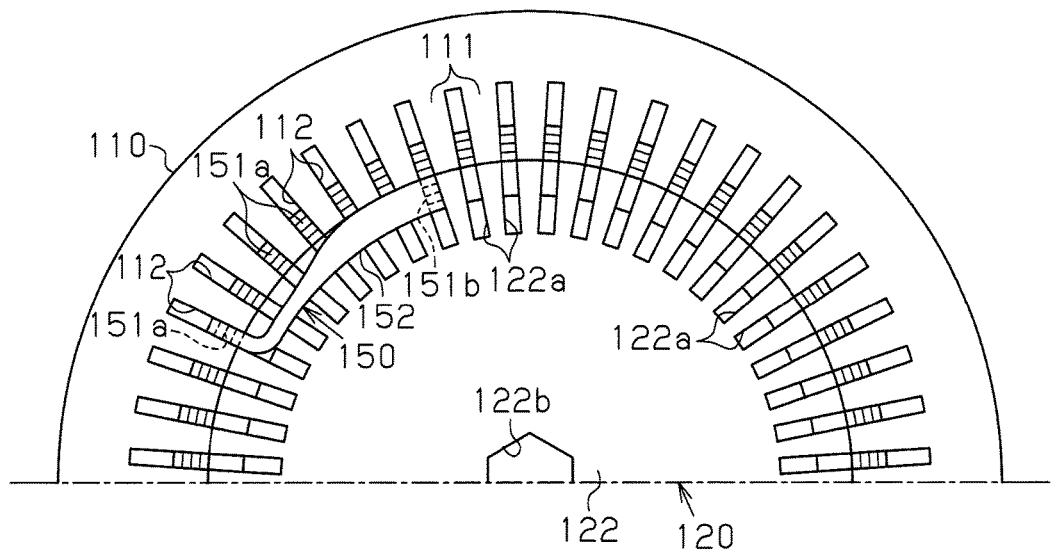
FIG. 29 is a schematic plan view corresponding to FIG. 23.

When using the pushing tool 145 like in the second embodiment, force ejecting the second sides 151b from the holding grooves 122a into the corresponding slots 12 may be directly applied to the second sides without the pusher 148 pushing the coil end 152. For example, when viewed from the axial direction of the stator core 110, in a state in which the holding jig 120 is arranged inside the stator core 110, the first sides 151a of the coils 150 are inserted in the slots 112, and the second sides 151b are inserted in the holding grooves 122a, as shown in FIG. 28, the joining portion 152c is shaped so as to be arranged within the width (length in the radial direction) of the second sides 151b. Then, in a state in which the stator core 110 and the holding jig 120 are relatively rotated so that the holding grooves 122a are positioned opposing the slots 112 in which the second sides 151b inserted in the holding grooves 122a are to be inserted, when viewing the stator core 110 from the axial direction, the joining portion 152c is shaped so as to be arranged in the width of the second side 151b as shown in FIG. 29. In this case, the pushers 148 enter the holding grooves 122a, the pushing portions 148a contact the second sides 151b, and ejecting force is directly applied to the second sides 151b to eject the second sides 151b out of the holding grooves 122a and into the corresponding slots 112.

The pusher 148 does not have to be plate-shaped as long as it includes the pushing portion 148a, in which the distance from the axis decreases as the distal end becomes closer. For example, the pusher 148 may be formed by a rod-shaped member including a basal side extending parallel to the axis and a part from a middle bent portion extending toward the axis.

Figure 30:
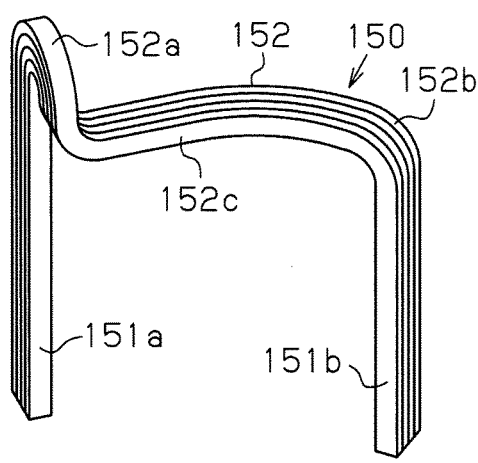
FIG. 30(a) is a partial schematic perspective view showing a coil end in a further embodiment.
FIG. 30(b) is a schematic plan view showing the coil end.
FIG. 30(c) is a partial schematic perspective view showing a conductive wire in a further embodiment.
Figure 30:
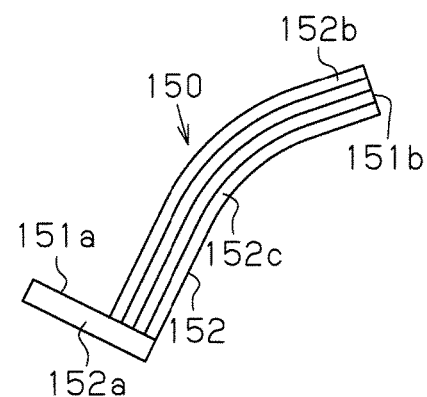
Figure 30:
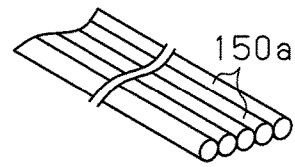

As shown in FIGS. 30(a) and 30(b), the coil 150 may include a semicircular first bent portion 152a. In this case, the radius of curvature of the first bent portion 152a is larger than the coil 150 shown in FIGS. 20(a) and 20(b). However, the formation of the coil 150 is facilitated. After the insertion of the second side 151b into the slot 112 is completed, when necessary, the first bent portion 152a is bent so that the projecting length in the axial direction from the end surface of the stator core 110 decreases.

The coil 150 only need to be formed so that in a state in which the second side 151b is inserted into the holding groove 122a, when the stator core 110 and the holding jig 120 are relatively moved in a state in which their axes are aligned, the coil end 152 located at the insertion side of the holding jig 120 does not interfere with the stator core 110. Accordingly, among the set of coil ends 152, only the first coil end 152 needs to include the first bent portion 152a, the second bent portion 152b, and the joining portion 152c. In this case, limitations on the shape of the coil end 152, which is located opposite to the first coil end 152, are less than the first coil end 152. This allows for the projection amount of the second coil end 152 from the end surface of the stator core 110 to be small and allows for reduction in the size of the stator S.

In the coil 150, even when the two coil ends 152 includes the first bent portion 152a, the second bent portion 152b, and the joining portion 152c, the two coil ends 152 do not have to be formed to be symmetric relative to a plane that is perpendicular to the first side 151a and the second side 151b.

Figure 31:
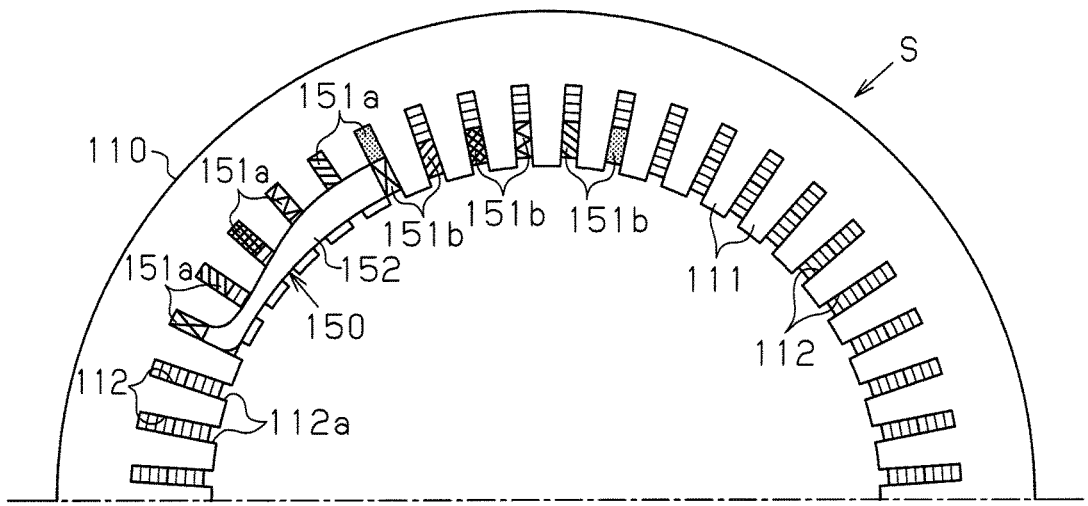
FIG. 31(a) is a schematic plan view showing a stator of further embodiment.
FIG. 31(b) is a schematic diagram showing the relationship of a first side and second side of the coil for each phase inserted into a slot.
Figure 31:
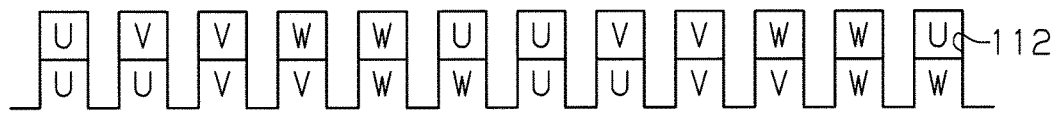
Figure 32:
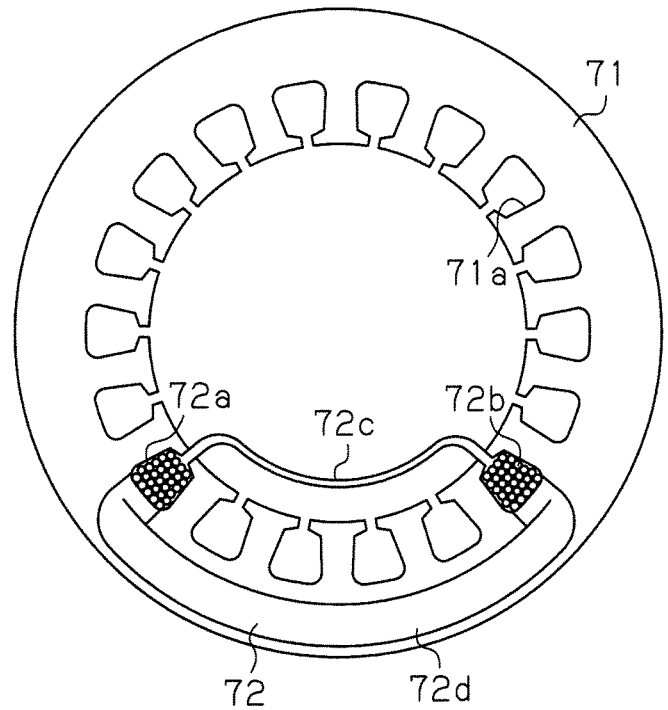
FIG. 32 is a schematic plan view showing a stator of the prior art.

The number of the slots 112 arranged between the first side 151a and second side 151b of the first coil 150 is not limited to five. For example, as shown in FIG. 31(a), the number may be four. In this case, as shown in FIG. 31(b), the ends of the conductive wires 150a of each coil 150 are connected so that slots 112 in which the first side 151a and the second side 151b of coils 150 having the same phase are inserted and a slot 112 in which the first side 151a and the second side 151b of coils 150 having different phases are inserted are alternately arranged.

The conductive wires 150a of the coil 150 do not have to be rectangular wires. For example, as shown in FIG. 30(c), conductive wires 150a having circular cross-sectional may be used in an aligned state. That is, the coil 150 may be a coil wound into a predetermined shape in a state in which round wires are aligned. In this case, when a plurality of conductive wires 150a form the coil 150, resin or the like is applied to or an insulative sheet is wound around at least part of the coil 150 accommodated in a slot 112 of the stator core 110 to maintain the bundled shape at the first side 151a and the second side 151b. The conductive wires 150a do not have to be arranged in a single line and may be arranged in plural lines.

The lifting device 131 does not have to include the hydraulic cylinder 137 to lift and lower the lifting support body 138. For example, the lifting support body 138 may be lifted and lowered by a ball screw mechanism, an air cylinder, or a linear motor.

In the stator core 110, the number of slots 112 is not limited to forty-eight and may be more than forty-eight or less than forty-eight. However, it is preferable that the number be a multiple of six.

There is no limitation to a two-layer winding stator S in which two of the first sides 151a and the second sides 151b are arranged in each slot 112. A single-layer winding stator S in which one of the first sides 151a and the second sides 151b are arranged in each slot 112 may be applied to the second and third embodiments.

In the manufacturing apparatus, when relatively moving the stator core 110 and the holding jig 120 in a state in which their axes are aligned to insert the first sides 151a into the slots 112, the stator core 110 may be moved instead of the holding jig 120.

In the manufacturing apparatus, in a state in which the holding jig 120 is arranged inside the stator core 110, the first sides 151a of the coils 150 are inserted into the slots 112, and the second sides 151b are inserted into the holding grooves 122a, the stator core 110 may be rotated to arrange the second sides 151b, which are inserted in the holding grooves 122a, at positions opposing the slots 112, into which the second sides 151b are to be inserted.

The coil 150 is not limited to lap winding as long as it is a distributed winding coupling two of the slots 112 and may be, for example, concentric winding.

The stator core 110 only needs to be annular with the slots 112 having the openings 112a that open in the inner circumference and the slot pitch increasing from the opening 112a toward the bottom. The stator core 110 may be a segmented type core formed by joining a plurality of core segments. However, when using a segmented type core, the magnetic resistance increases, and the output of the electric rotating machine cannot be increased. It is thus preferable that a segmented type core not be used.

The present invention is not limited to the stator of a motor and may be applied to other types of rotating machines such as the stator of a generator.

The invention claimed is:

1. A stator for an electric rotating machine, the stator comprising:
    an annular stator core including a plurality of slots arranged along a circumferential direction and opening inward in a radial direction, wherein the stator core includes two end surfaces located at opposite sides in an axial direction of the stator core; and
    a plurality of distributed winding coils coupled to the stator core, wherein each of the coils includes a first insertion portion and a second insertion portion, which are inserted into two of the slots, and a first coil end and a second coil end, which respectively project from the two end surfaces, wherein
    each of the first coil end and the second coil end includes a twisted portion at one side and a bent portion at an opposing side,
    the twisted portion and the bent portion are spaced from each other;
    the twisted portion is formed by twisting each of the first coil end and the second coil end at a location near the first insertion portion,
    the bent portion is formed by bending each of the first coil end and the second coil end near the second insertion portion,
    each of the coils has a first surface and a second surface arranged opposite of the first surface,
    the first surface of a single layer coil at the first coil end and the first surface of the single layer coil at the second coil end are both facing a same direction, and
    the first surface of the single layer coil faces a direction perpendicular to a direction in which the first and second insertion portions extend.

2. The stator according to claim 1, wherein the bent portion includes a rising portion that raises the bent portion of one of the first coil end and the second coil end in the axial direction of the stator core.

3. The stator according to claim 1, wherein a length of coil material that forms the second insertion portion and both of the bent portions adjacent to the second insertion portion is longer than a length of coil material that forms the first insertion portion and both of the twisted portions adjacent to the first insertion portion.

4. The stator according to claim 1, wherein the coils are arranged so that coil ends of adjacent coils are overlapped in the circumferential direction, a space is formed in an overlapping part of the coil ends, and the space has a shape including a generally flat plane extending between two ends of the coil ends in the axial direction of the stator core.

5. The stator according to claim 1, wherein each of the coils is formed by winding a rectangular wire through flatwise bending.

6. The stator according to claim 1, wherein each of the first coil end and the second coil end has a curved shape and is convex outward in the radial direction of the stator core between the twisted portion and the bent portion.

* * * * *